United States Patent [19]
Leoni

[11] Patent Number: 6,017,082
[45] Date of Patent: Jan. 25, 2000

[54] TRUCK TRAILER BODY WITH SLIDING NESTABLE CANOPIES

[76] Inventor: Michael C. Leoni, 3167 Golfview, Saline, Mich. 48176

[21] Appl. No.: 09/190,753

[22] Filed: Nov. 12, 1998

Related U.S. Application Data

[63] Continuation-in-part of application No. 29/079,361, Nov. 13, 1997, and a continuation-in-part of application No. 29/079,451, Nov. 13, 1997, Pat. No. Des. 408,332, and a continuation-in-part of application No. 29/079,352, Nov. 13, 1997.

[51] Int. Cl.⁷ .................................. B60J 7/00; B60P 7/02
[52] U.S. Cl. ....................................... 296/181; 296/100.03
[58] Field of Search .............................. 296/181, 100.02, 296/100.03, 100.04, 100.05, 104

[56] References Cited

U.S. PATENT DOCUMENTS

| | | |
|---|---|---|
| D. 245,244 | 8/1977 | Arnot, Jr. et al. . |
| D. 295,734 | 5/1988 | Barber et al. . |
| D. 314,164 | 1/1991 | Barber et al. . |
| D. 338,641 | 8/1993 | Brutsche . |
| D. 388,024 | 12/1997 | Clement . |
| 4,595,231 | 6/1986 | Bennett et al. ............... 296/181 |
| 4,613,182 | 9/1986 | Stone ........................ 296/181 |
| 4,770,461 | 9/1988 | Lovaas . |
| 4,854,633 | 8/1989 | Kraft et al. ................. 296/104 |
| 4,909,561 | 3/1990 | Lovaas . |
| 4,940,279 | 7/1990 | Abott et al. ................. 296/181 |
| 5,067,766 | 11/1991 | Lovaas . |
| 5,190,341 | 3/1993 | Simard ...................... 296/100 |
| 5,193,176 | 3/1993 | Roberts ..................... 296/181 |
| 5,203,603 | 4/1993 | Hertzberg et al. ........... 296/100 |
| 5,507,405 | 4/1996 | Thomas et al. .............. 296/181 |
| 5,516,182 | 5/1996 | Aragon et al. . |
| 5,564,773 | 10/1996 | Lapsley et al. . |
| 5,639,139 | 6/1997 | Rush ........................ 296/181 |
| 5,704,676 | 1/1998 | Hill ......................... 296/181 |

*Primary Examiner*—D. Glenn Dayoan
*Assistant Examiner*—Lori L. Coletta
*Attorney, Agent, or Firm*—Harness, Dickey & Pierce, P.L.C.

[57] ABSTRACT

A truck trailer body system has an elongated cargo-supporting bed with front and rear bulkheads and sliding nestable rigid enclosure sections, called canopies, which are movable between the bulkheads. The canopies are positionable for completely enclosing and protecting cargo from environmental damage during transportation or storage, and also for selectively providing largely unfettered access to the cargo for any purpose, such as inspection, loading, and unloading, as desired. The enclosure sections or canopies ride on roller mechanisms for movement along tracks extending along either side of the trailer bed over its entire length. The individual canopy sections, when unlocked, slide relatively freely along the length of the tracks. Locking systems are provided to secure the canopies in a fixed position on the trailer so as to prevent unwanted movement, and to prevent them from decoupling from one another.

20 Claims, 13 Drawing Sheets

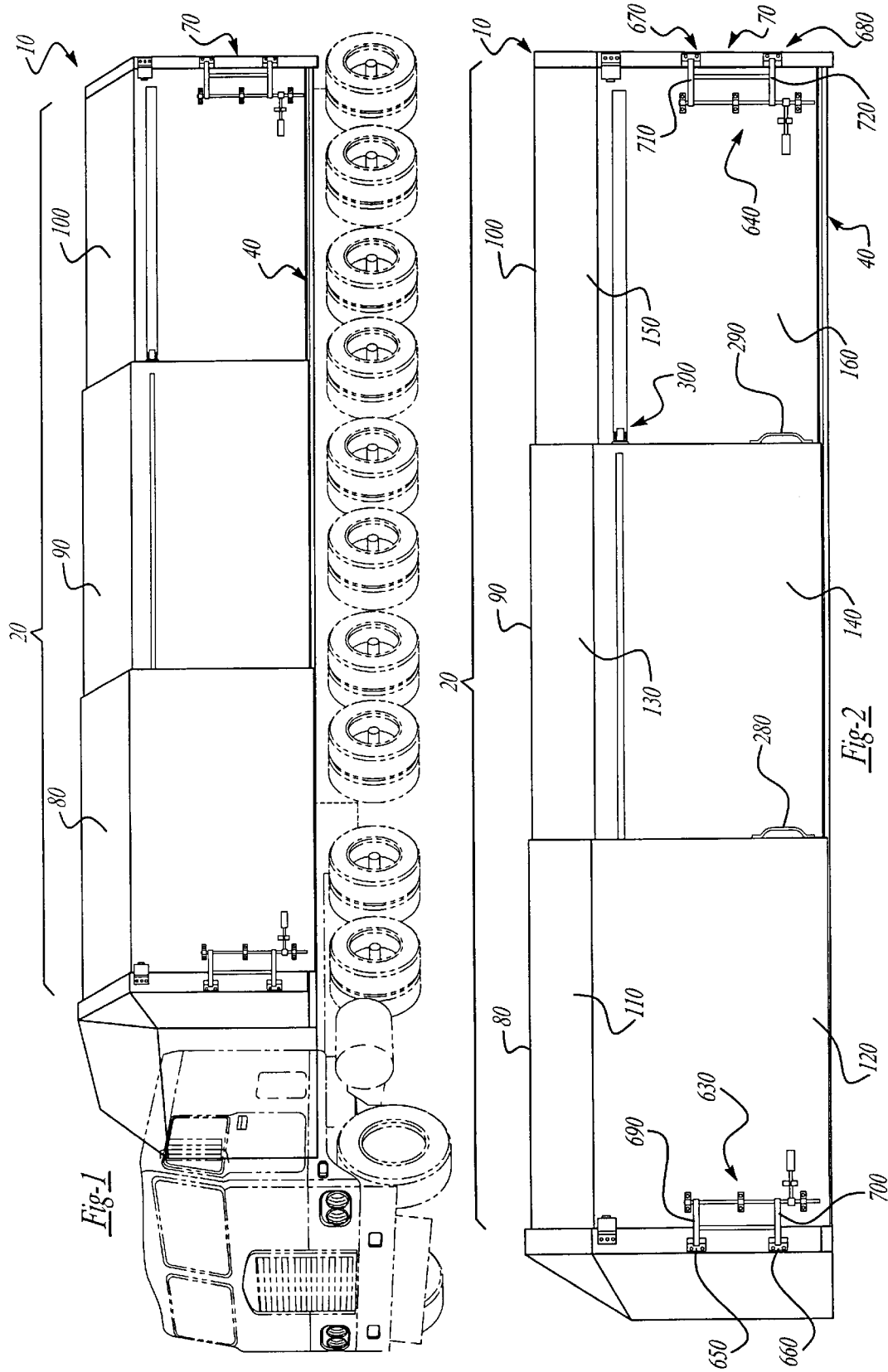

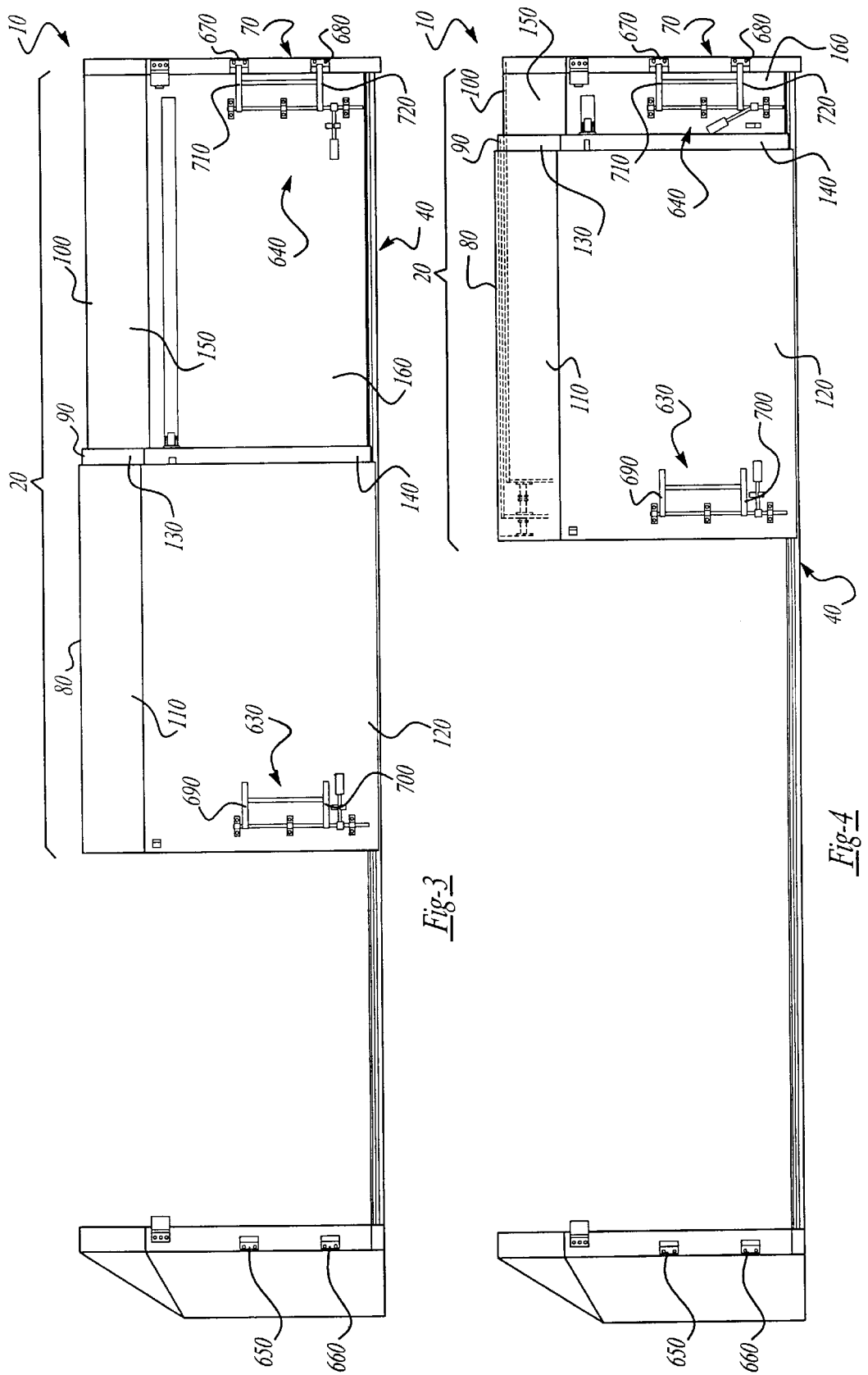

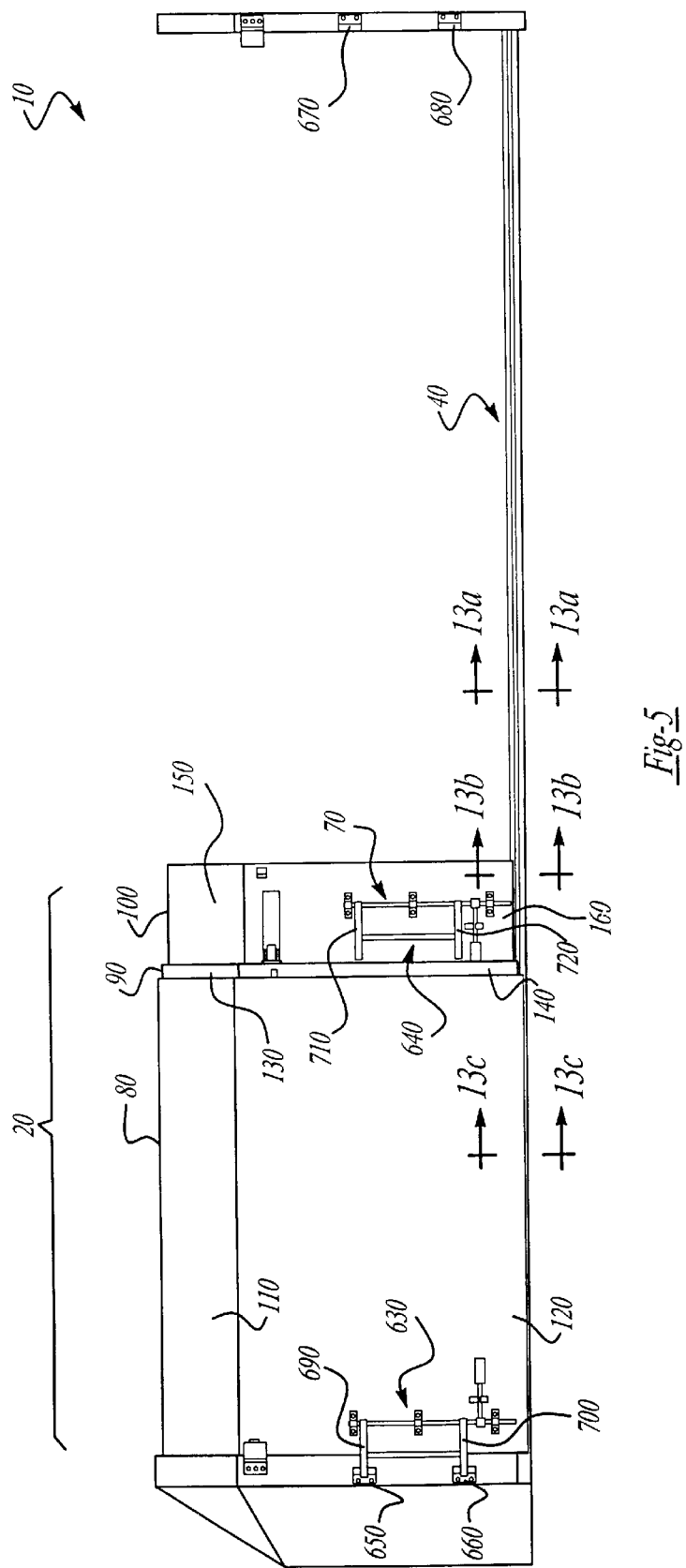

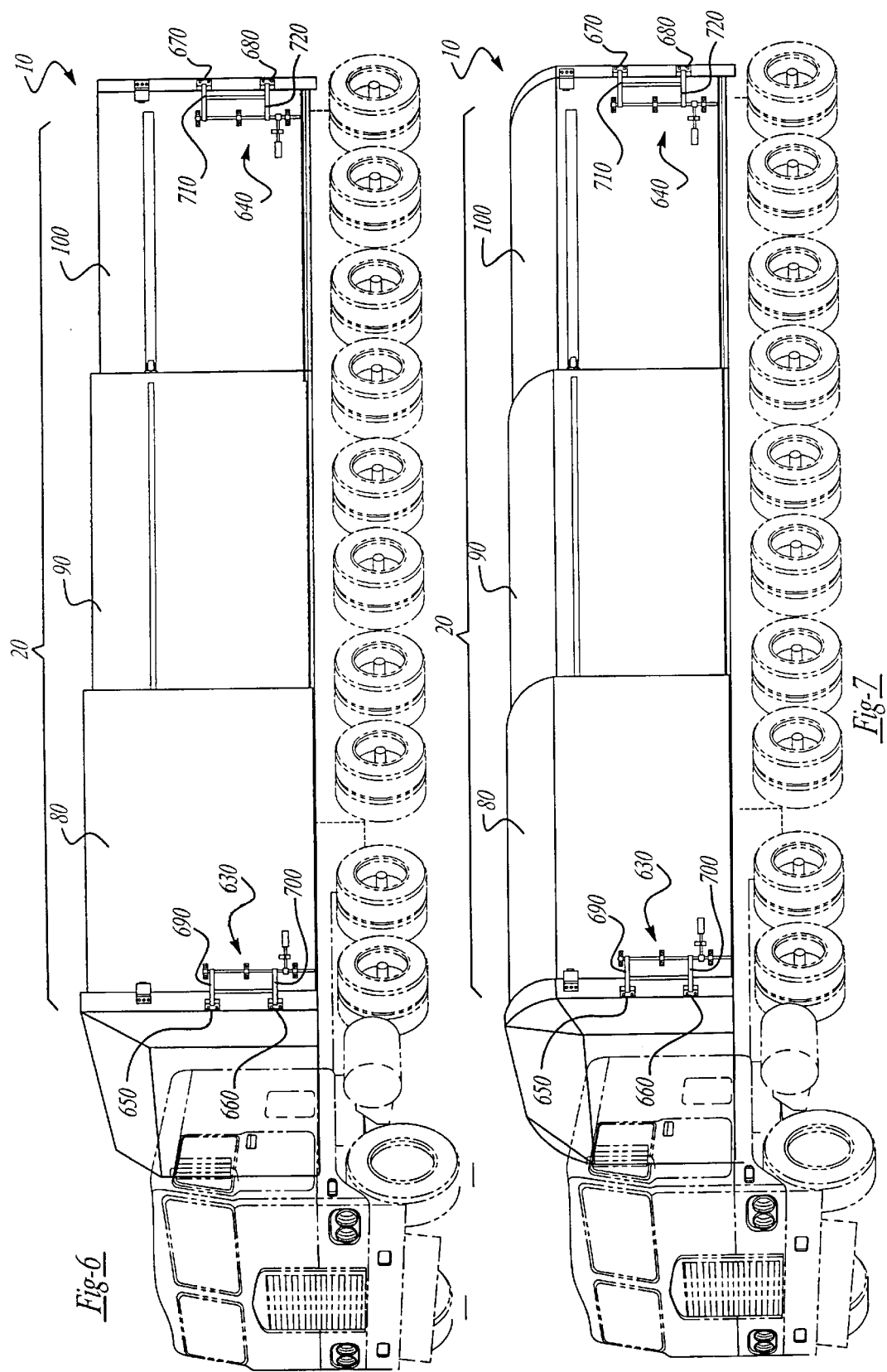

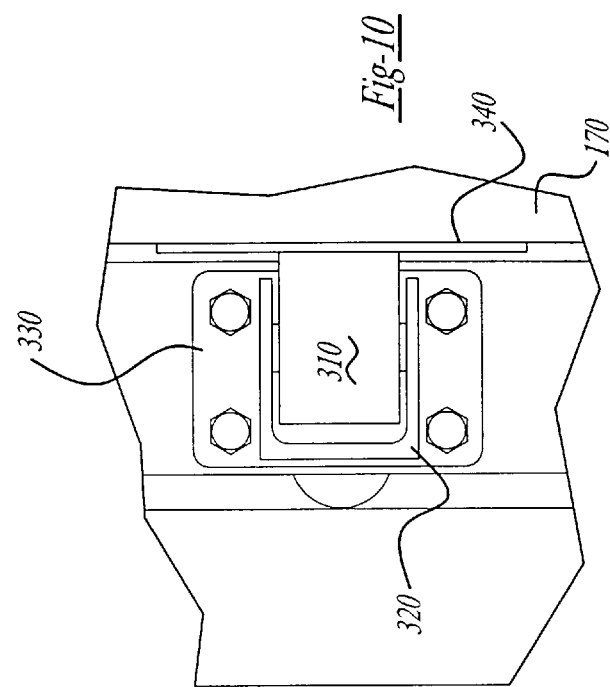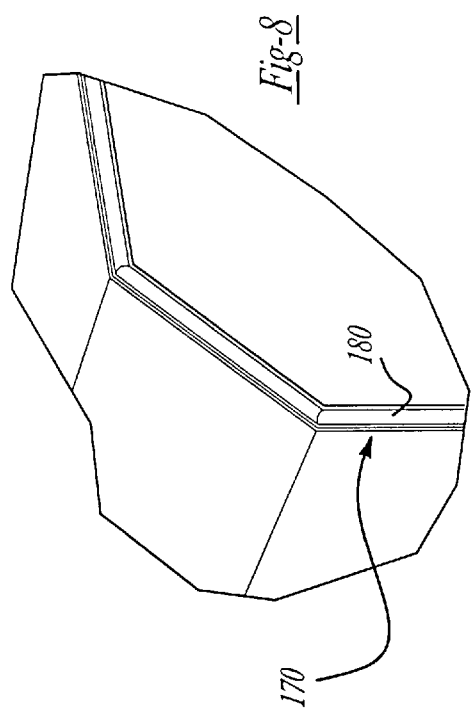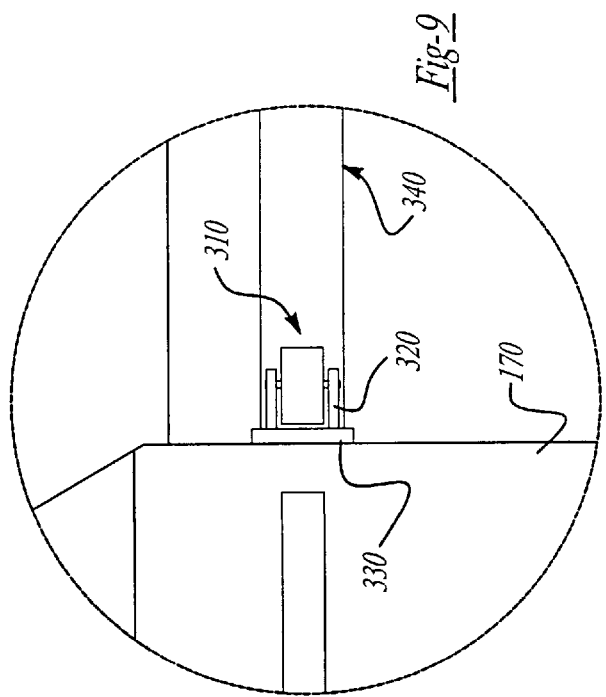

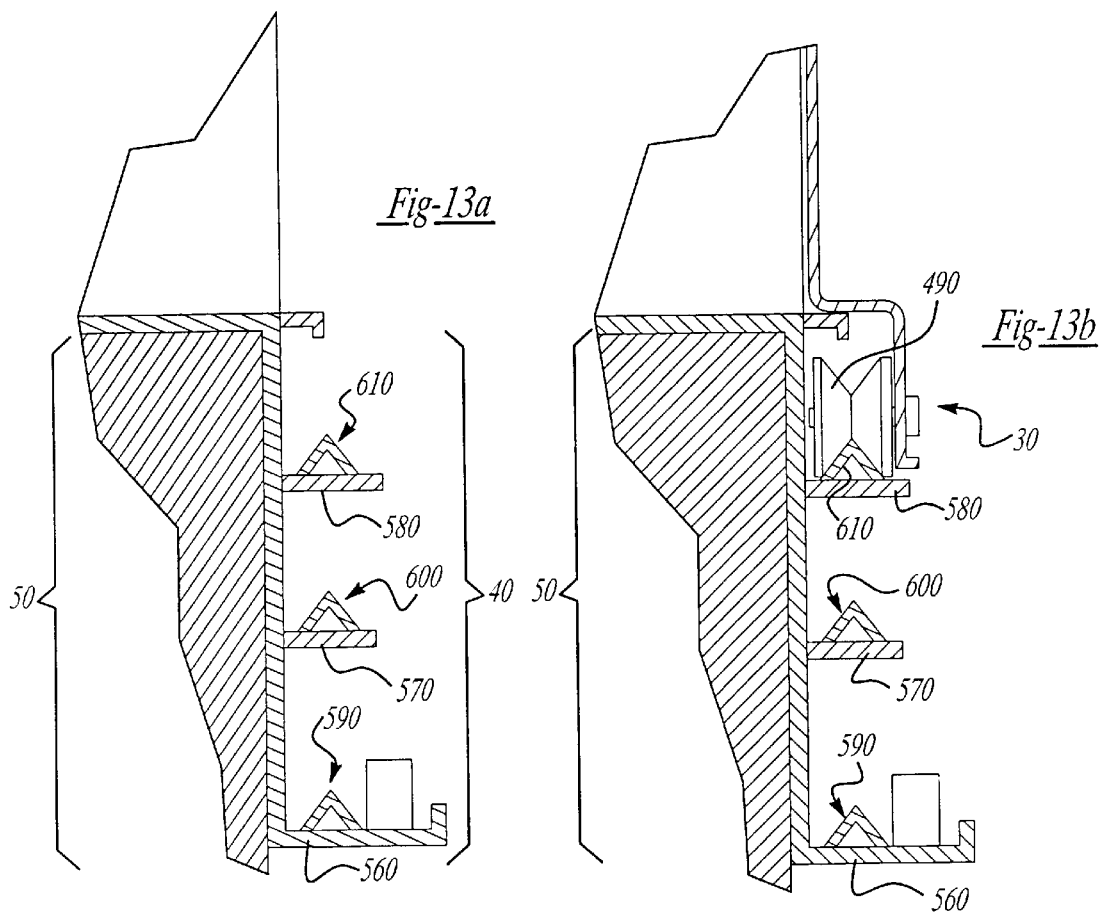
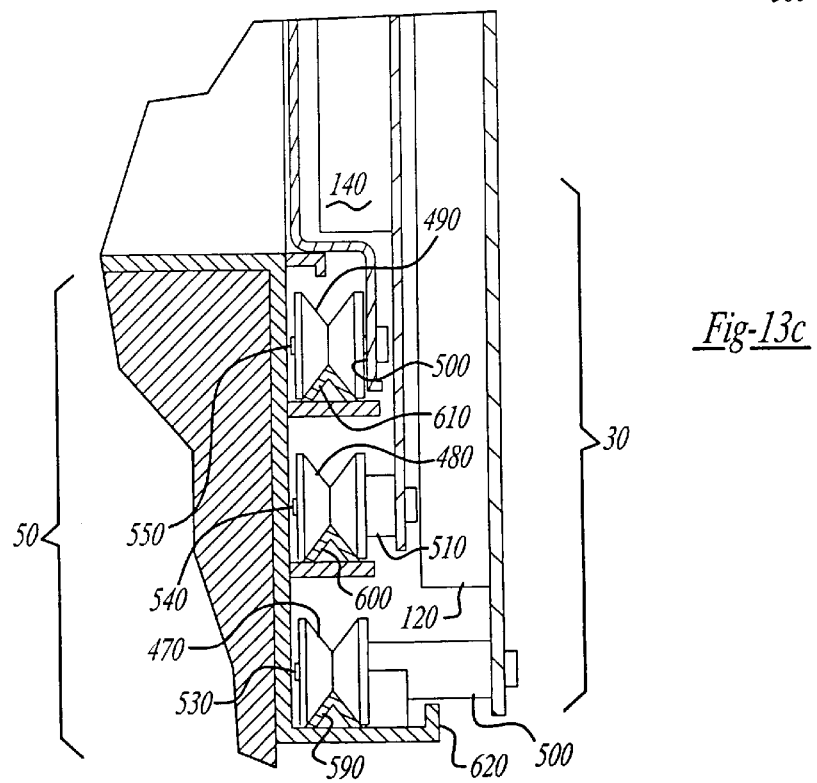

TRUCK TRAILER BODY WITH SLIDING NESTABLE CANOPIES

CROSS-REFERENCE TO RELATED APPLICATIONS

This application is a continuation-in-part of three U.S. design patent applications all filed on Nov. 13, 1997, namely Ser. No. 29/079,361 entitled "Truck Trailer Body With Rectangular Sliding Canopies," Ser. No. 29/079,451 entitled "Truck Trailer Body With Trapezoidal Sliding Canopies", now U.S. Pat. D. No. 408,332 and Ser. No. 29/079,352 entitled "Truck Trailer Body With Rounded Sliding Canopies."

FIELD OF THE INVENTION

The present invention relates in general to large multi-axle covered truck trailers for highway use, and in particular to large truck trailer body systems with long beds and sliding nestable canopies for selectively covering and protecting large or bulky cargo from environmental damage during transportation or storage, and selectively providing unfettered access to the cargo and trailer bed during loading and unloading, and for inspection purposes.

BACKGROUND OF THE INVENTION

The development and widespread use of large trucks known as tractor trailers or semis has enabled the relatively efficient and economical movement of large amounts of cargo across long distances over our highways. A tractor trailer generally consists of a tractor which provides the locomotive force necessary to haul a detachable multiple-axle trailer which supports the cargo to be transported. The multiple-axle trailer component typically consists of a trailer chassis or underframe with a cargo-carrying bed mounted thereon, and an appropriate number of axles and wheels mounted to the chassis to support and distribute the weight of the cargo upon the road. The tractor and trailer are detachably connectable through conventional pivotable couplings, which are typically centered above the rear axle of the tractor, and which facilitate the turning of such multi-axle trucking rigs. A single axle or double axle may be provided in the rear of the tractor. At the rear of trailer, a single axle may be provided. But often times, especially for larger trailers or trailers carrying larger weight, there may a double axle provided at the rear of trailer. In a typical standard 18-wheeler tractor-trailer combination, the double axles of the rear of the tractor serve as the front axles of the trailer. As cargo weight increases, two or more sets of axles and wheel assemblies are often provided on the trailer.

The conventional covered trailer body is a flat bed with generally rectangular tall elongated enclosure having rigid walls and ceiling permanently mounted to the bed. One or more doors are typically provided on the rear or side panels or walls of the trailer enclosure for ingress into and egress from the trailer's interior. The enclosure also serves to protect the cargo from damage caused by various environmental sources and from theft and vandalism. One disadvantage of these conventional fully enclosed trailers is that they can only be used to transport certain types of cargo, namely cargo which can be easily loaded and unloaded through the rear or side doors. Boxes, crates, household appliances, and furniture that can be moved by hand or with a hand truck, and pallets of products or materials that can be readily moved by a small forklift truck are generally well-suited to transport with these conventional enclosed trailers. However, the loading and unloading of cargo in and out these trailers necessarily proceeds on first-in last-out basis. This is particularly true where the cargo is bulky, or is sufficiently heavy so that a forklift truck is required to pick up and move the various bundles or pallets of cargo. Further difficulties arise when extremely large, heavy, or irregularly shaped items need to be loaded and unloaded from these conventional trailers. For example, cargo such as large steel coils, large cable spools, long steel beams and bundles of long rods, bars or pipe are not generally well-suited to transport with a conventional enclosed trailer. These items are usually either so heavy (e.g., in excess of 1,000 pounds to a few tons) or so difficult to handle (e.g., steel beams or metal rod or pipe bundles may be 10 to 20 feet long and weigh a 1,000 pounds or more) that a power crane with a motorized winch and steel cable or heavy chain is typically needed to load and unload them. A conventional trailer does not provide a sufficient amount of unfettered access to the cargo within the trailer, especially from the top and side directions, to allow the use of any kind of overhead crane. Thus, it is very difficult to safely load or unload these types of cargo into a conventional enclosed trailer.

Another disadvantage of conventional enclosed trailers is that, when fully loaded, it is difficult to gain access to or inspect the cargo in front, especially if the only ingress to the trailer is located in the rear portion of the trailer, or the trailer is tightly packed, such as being loaded from floor to ceiling. In such cases, most if not all of the later-loaded cargo must be removed from the trailer in order to gain access to the cargo located in the forward portion of the trailer. This can be a problem if any kind of inspector wants to spot-check the contents of the trailer.

Still another disadvantage of conventional trailers is that the limited access to the interior areas may make it more difficult to safely secure certain types of cargo within the trailer against unwanted movement during transportation. The geometric shape, dimensions or weight distribution of certain kinds of cargo may render the cargo inherently unstable during any type of severe movement by the trailer, unless the cargo is carefully secured. The covered side walls and tops of most enclosed trailers severely limit the manner and means by which cargo may be secured.

Using flat-bed truck trailers is a common way to overcome the above-noted disadvantages of conventional enclosed trailers. Typically, flat-bed trailers are used to transport cargo which is not well-suited for conventional enclosed trailers. Flat-bed trailers normally do not have any kind of side walls or roof panels, and thus they permit unfettered access to the cargo from the top, side and even front and rear directions. Flatbed trailers may be modified to include cargo wells that are built into, or cargo-holding fixtures that are mounted on, the bed of the truck. Such wells or fixtures are often used with trailers that are to carry very heavy cargo, such as sheet steel coils or steel bar stock weighing a few tons. Their use ensures such modified flat-bed trailers will have to be loaded and unloaded from the top or the sides, since a forklift truck can be driven on such an irregularly shaped trailer bed. Such loading and unloading requirements in turn means that it is not possible to have a conventional permanently installed rectangular trailer enclosure mounted to the bed of a trailer that is used for such hauling purposes. Some flatbed trailers are modified by providing short side walls, having a height of a few inches to about two feet. Using these short walls means that loading of heavy objects must be handled from overhead, using a crane or other kind of hoist.

One significant disadvantage of flat-bed trailers is that they expose their cargo to the elements, potentially leading to damage to the cargo. Tarps or other protective coverings are often used, but even these allow some exposure to occur. Holes or tears in such protective coverings allow water, salt, and other unwanted substances to come into reach of the cargo. The tarps themselves may become dirty or covered with road dust, grit, grime and/or road salt. This undesirable exposure can either occur during actual transit (e.g., rain storms, water splashed upwardly by another passing vehicle, wind-blown rain or road mist or dirt or other debris) or during storage in parking lots or the like (e.g., rain or the falling dew in the evening tends to collect and concentrate atmospheric pollutants such as sulphur emissions, hence the term "acid rain"). Even dirty water dripping off of bridges, leaking overhead pipes and roofs, and chemical sprays or salty mists such as may be found at a truck wash, or near some factories or construction sites, or along the coastal highways near oceans, may also harm uncovered cargo.

The ability to protect cargo from such undesirable environmental exposure during transit and storage is becoming increasing important to the trucking industry. Damaged cargo leads to increased customer dissatisfaction and costs, increased insurance premiums, and interruptions and delays in manufacturing and delivery schedules. Customers are increasingly demanding that trucking concerns deliver cargo in an undamaged state.

Many types of cargo are susceptible to damage due to exposure to the elements or environmental factors or contaminants. These include water, ice, hail, extreme temperatures, solar radiation (particularly ultraviolet rays), chemicals (e.g., salt, oil, exhaust vapors from power plants or vehicles which can result in acid rain, gasoline byproducts, hazardous materials), and abrasive road debris (e.g., small rocks, sand, dust, asphalt byproducts, and loose road construction materials). All can have significant deleterious effects on different types of cargo.

Unfinished metal products and materials, such as sheet metal blanks, metal rods, pipes and even steel coils, are types of cargo that are especially susceptible to damage from these kinds of environmental sources. Typically, such products or materials are being shipped from a component plant, a stamping plant, bar or pipe mill, steel mill or foundry to another location where they will be further processed and/or assembled into a larger product such as a motor vehicle. Alternatively, they may be treated or coated with various substances, and then made into a component. For example, unfinished sheet metal blanks may be turned into car hoods or car fender panels or floor panels. During the finishing process, they may be painted or coated one or more times to enhance their ability to resist corrosion and other types of physical and chemical damage.

Exposure of unfinished metal goods or materials to environmental sources, especially salt, salt-laden water or road dust or grit, prior to being treated or coated, tends to compromise the future adherence of paint or other coatings to their unfinished surfaces. Further, these contaminants can eliminate or reduce the protective benefits of later surface treatments on such parts or materials, thus possibly leading to accelerated rates of rust or other surface damage on the finished products. Cleaning contaminated unfinished metal goods by hand, or by washing them with water or in expensive chemical baths laden with hazardous substances, may be required in order to restore their surfaces to an acceptable clean state for later coatings or painting. Such cleaning steps increase production costs and may create further pollution concerns, including waste water disposal issues.

The automotive industry is particularly interested in protecting bulky cargo from environmental damage during transit. Types of unfinished cargo which are at risk of being damaged by environmental factors and/or vandalism while in transit include blank steel and/or aluminum sheets cut to size, blank sheets already partially formed, racks of glass windshields, substantially completed automotive body panels, which are awaiting coating and/or painting and/or other further processing prior to final assembly.

For example, consider automotive blanks which are comprised of steel sheets which have already been stamped or shaped by power presses and are now to be shipped to another location for welding to other parts, painting, and/or other operations, including ultimately assembly into an automotive vehicle. Generally, these pre-formed steel blanks are stamped out by the hundreds or thousands. The steel sheets are typically stacked one on top of another in a nesting manner in order to make economical use of the available space both in the factory and during transport by tractor-trailer. Stacked steel sheets are generally placed upon steel pallets for shipment and often are secured in place by a plurality of registration pins or posts which extend through a plurality of aligned locating holes provided in the steel sheets, and carefully placed auxiliary strapping or banding as necessary. Such pallets help ensure the blanks are substantially immobilized relative to one another during shipment on flat-bed trucks from one location to another.

A problem arises during transportation when salt and/or grit (such as dirt, sand or dust), comes into contact with the exposed surfaces of the stacked steel sheets or blanks. Typically the top sheet, and side surfaces or edges of the individual intermediate sheets or blanks within the stack, will become contaminated. If they are not properly cleaned after transit, then the salt or grit will come into contact with the forming surfaces of the dies in the power presses or handling surfaces of the grippers in the automatic material handling equipment. This in turn leads to marks or blemishes on the finished parts when none should be present. Contaminants near the edges of the stamped steel blanks may interfere with the formation of quality welds.

In an effort to overcome these kinds of cargo contamination problems associated with flat-bed trailers, the trucking industry has attempted to cover the parts during shipment with canvas or other flexible tarps, such as plastic-covered fabric sheets. Tarps are often mounted on pay-out rollers to facilitate putting the tarps over the cargo and taking them off the cargo. Although useful, tarps are still labor intensive, in that they must be securely tied down to resist the road wind, and must be replaced periodically due to wear and tear, such as wind-shredding.

One effort to solve these problems has involved providing a trailer with tall rigid side walls and an open top that is covered by removable canvas. This arrangement has the drawback of restricting access to the cargo from the sides of the trailer, which makes it much more difficult to load and secure the cargo during loading, and to unsecure and remove the cargo during unloading.

Another effort to solve these problems has involved the use of a pleated accordion-style fabric-based enclosure to cover a flat-bed truck. Front and rear upstanding rigid metal bulkheads at the front and rear of the trailer bed provide support for anchoring the front and rear ends of the fabric enclosure. These flexible, pleated coverings are supported by transverse metal reinforcing hoops at regular intervals. (Thus they bear a certain resemblance to the covered enclosure used on the century-old horse-drawn Conestoga wagons.) In one conventional design, the hoops are supported by trolleys which ride on rails positioned along the outer side edges of a flat-bed trailer. This covering can be pulled forward, so that it collapses in pleated accordion fashion, thus providing access to most of the cargo space on the flat bed trailer to permit easy loading and unloading of cargo onto and off of the trailer. When in transit, the fabric covering is stretched taut between the front and rear bulkheads. However, these fabric-reinforced cover/enclosures on flat-bed trailers are susceptible to tearing, since they repeatedly billow in the wind as the trailer travels at highway speeds. They puncture readily, and tend to be drafty. They allow airborne contaminants (albeit in reduced amounts) to come into contact with the cargo within, and the billowing of the fabric sides may even pump ambient air and road dust into and out of the moving trailer.

Neither the tarps nor the Conestoga-wagon-style coverings provides much protection against swings in the temperature of the cargo due to ambient temperatures, Nor do they provide much security. Keeping the cargo from getting too cold or too hot is often desirable. Extra cold metal blanks cannot be painted or coated until they warm up to a certain temperature, such as 50 to 70 degrees F. Metal parts which have become hot from sitting in the sun may be too hot to paint or otherwise process, and must be allowed to cool down. As for security, a sharp knife can be used by vandals or others to gain access to the cargo.

Thus, there still exists a need for a truck trailer body or enclosure or covering suitable for use with a flat-bed trailer that protects against environmental damage, like a conventional rigid enclosed trailer, while providing essentially unfettered access. It would also be helpful to protect the cargo against temperature extremes during transit between nearby plants.

It accordingly is a main object of the present invention to provide an enclosure system for selectively covering cargo to be shipped by flat bed trailer over the highways, and protecting it from environmental damage during transport or when stored on the trailer, while still permitting the cargo on any part of the trailer to be rapidly and easily accessed.

A related object is to provide a trailer enclosure with several movable sections that can selectively provide unfettered access to the cargo space of a flat bed highway trailer, for inspection, loading and unloading.

Another object of the present invention is to provide a truck trailer body system with sliding nestable canopies for selectively protecting the cargo to be shipped by trailer over the highways from the environmental damage, while selectively providing largely open access to that cargo. Another object is to provide a truck trailer body system with sliding nestable rigid canopies that can be positioned at any number of locations along the bed of the trailer so as to expose any desired major section of the trailer bed or the cargo contained thereon.

Still another object of the present invention is to provide a truck trailer body system with sliding nestable interlocking canopies provided with restraining mechanisms that can be secured to prevent or minimize movement of the canopy sections during highway transport. Still other objects include providing a truck trailer body system with sliding nestable canopies that are insulated and weather-sealed to help keep out wind and environmental contaminants, and that optionally can contain means for controlling the temperature of the interior area of the truck trailer body.

SUMMARY OF THE INVENTION

In order to overcome the aforementioned disadvantages and achieve many of the aforementioned objects, the present invention provides a truck trailer body system with movable enclosure sections, which are preferably sliding nestable canopies, in accordance with the preferred embodiments shown and described herein.

The present invention overcomes many of the aforementioned disadvantages by providing a truck trailer that has multiple movable rigid hollow body sections or enclosures, called canopies, for selectively covering and protecting any type of cargo placed therein from environmental damage that might otherwise occur during transportation or storage. These canopies selectively providing substantially unfettered access to the cargo from the top and sides, for any purpose including inspection, loading and unloading. The canopies can be insulated and weather seals provided to create movable, sliding, interlocked enclosure sections that when extended from a truck trailer enclosure that is substantially sealed and may be insulated so as to help protect the cargo inside against ambient temperature extremes during transport. Temperature regulating means, including heaters and/or air conditioners, may optionally be provided to further help control temperature extremes within the enclosed space under the canopies.

In accordance with a first embodiment of the present invention, there is provided a truck trailer body system with sliding nestable substantially rigid canopies for covering and protecting cargo. This truck trailer body system preferably comprises a trailer or at least a substantially rigid trailer bed, preferably arranged in an elongated generally planar configuration and having at least one generally horizontally load-bearing surface for supporting cargo to be transported. The bed preferably also has opposed side support surfaces for a canopy-mounting system which preferably includes track mechanisms, as described below. Additionally, the trailer body system preferably has upstanding front and rear bulkheads positioned respectively at the front and rear portions of the trailer bed.

This trailer body system includes at least first and second substantially rigid canopies, each of the canopies having a roof and a pair of opposed and spaced downwardly depending walls, and preferably having substantially open front and rear areas. These enclosure sections or canopies are preferably configured to be substantially nestable within one another, and are preferably movably supported so that this nesting can occur near the front end of the trailer and near the rear end of the trailer, or at any place in between. This makes it possible to load and unload cargo at various locations on the trailer bed.

The trailer body system of the present invention also preferably has a transport system for enabling the individual enclosure sections of this enclosure system to be moved relative to the trailer when the trailer is at rest. The transport system includes a plurality of support elements associated with each canopy or enclosure section, and these elements are preferably roller mechanisms, with one set provided for and preferably rigidly fastened to the lower part of the side walls each of the canopies.

The body system also includes a mounting system, preferably formed of first, second, and third mounting members, with the roller mechanisms being slidably received within or on top of the mounting members. These mounting members to permit the enclosure sections to be moved back and forth along at least most of the length of the trailer. The mounting members are preferably elongated tracks rigidly fastened to the opposed sides of the trailer or trailer bed.

The second or middle canopy is sized and arranged to be telescopically received and slidably disposed substantially within the first canopy, and the third canopy is sized and arranged to be telescopically received and slidably disposed substantially within the second canopy. The front and rear edges of the first and third canopies, preferably butt up against the bulkheads. In a presently preferred arrangement, the first canopy is the largest and third canopy is the smallest, and during transport, the first canopy is in the front, and abuts the front bulkhead, and the third canopy is the smallest, and abuts the rear bulkhead. The relationship can easily be reversed if desired. In order words, the largest canopy can be used in the rear, while the smallest is used up front. As more fully set forth below, in the detailed description and/or the claims, still other configurations are possible.

In accordance with another aspect of the present invention, there is provided a method for selectively covering, and for selectively providing substantially unfettered access to, cargo on the bed of an elongated truck trailer to be used for transporting cargo on highways. This method preferably comprises the following steps. First, provide at least at first, second and third movable nestable substantially rigid enclosure sections, each of the sections having generally vertically depending side wall portions interconnected by a roof portion. The enclosure sections are each preferably interconnectable to adjacent enclosure sections, and each are preferably selectively movable along a longitudinal path between the front and rear ends of an elongated trailer bed, and arranged so that up to about two-thirds of the trailer bed may be uncovered as desired.

Second, move at least the first and second enclosure sections in a front-to-rear direction along the trailer bed, without removing the enclosure sections from the trailer, in order to load or unload cargo from the front half of the elongated trailer bed. Third, move the first and second enclosure sections in a rear-to-front direction to cover cargo loaded onto the front half of the trailer bed. Fourth, move at least the second and third enclosure sections in a rear-to-front direction along the trailer bed, without removing the second and third enclosure sections from the trailer, in order to load or unload cargo from the rear half of the elongated trailer bed. Fifth, move the second and third enclosure sections in a front-to-rear direction to cover cargo loaded onto the rear half of the trailer bed. If the desired, the fourth and fifth steps may be performed before the second and third steps are.

A more complete appreciation of the various embodiments and aspects of the present invention and the scope thereof can be obtained from a study of the accompanying drawings, which are briefly summarized below, the following detailed description of the invention, and the appended claims.

BRIEF DESCRIPTION OF THE DRAWINGS

FIG. 1 is a perspective view of a preferred embodiment of the truck trailer body system of the present invention, which system has three telescoping, nestable canopies slidably mounted upon the trailer bed and front and rear bulkheads rigidly secured to the trailer and bed, with the trailer having a conventional trailer chassis with multiple axles and wheels shown in phantom attached to a tractor, also shown in phantom.

FIG. 2 is a side elevational view of a truck trailer body system according to FIG. 1 with its nestable canopies fully extended along the trailer bed, the canopies each having an inverted U-shaped transverse cross-section formed by a flat roof and two tall vertical side walls, with short angled wall portions disposed therebetween.

FIG. 3 is a side elevational view of the FIG. 1 truck trailer body system within shown in a partially extended/partially nested state, with its middle canopy nested in the front canopy.

FIG. 4 is a side elevational view of the FIG. 1 truck trailer body system with its canopies shown in a fully nested state in close proximity to the rear bulkhead.

FIG. 5 is a side elevational view of the FIG. 1 trailer body system with its canopies shown in a fully nested state in close proximity to the front bulkhead.

FIG. 6 is a side elevational view of a second version of the present invention, namely a truck trailer body system with three movable, telescoping, nestable rigid canopies, each canopy having a rectangular transverse vertical cross-section, shown in a fully extended state.

FIG. 7 is a side elevational view of a third version of the present invention, namely a truck trailer body system with three movable, telescoping, nestable rigid canopies, each having a generally rectangular transverse vertical cross-section with generally rounded upper edge portions, shown in a fully extended state.

FIG. 8 is a partial perspective view of a peripheral surface of a FIG. 1 canopy that abuts against a bulkhead.

FIGS. 9 and 10 are enlarged partial side elevational views and end views, respectively, of the upper roller assembly mounted on the rear edge of the middle canopy, which bears against a wear plate on the rear canopy, as shown in FIG. 5.

FIGS. 13A, 13B and 13C are each enlarged partial cross-sectional views of the left side portion of the trailer bed, taken along lines 13A—13A, lines 13B—13B and lines 13C—13C, respectively, of FIG. 5, where:

FIG. 13A shows the cross-sectional profile of the three elongated tracks of the mounting system, which tracks are vertically mounted one above the other on the side of the trailer bed, FIG. 13B shows in partial cross-section a roller mechanism of the rear canopy positioned in the uppermost track, and FIG. 13C shows in partial cross-section, a roller mechanism from each of the three canopies positioned in a respective track of the mounting system, and illustrating how the widths of the canopies increase, with the innermost (rear) canopy having the smallest width, followed by the middle canopy, with the outermost (front) canopy having the largest width.

In the Figures, like reference numerals refer the same or very similar parts in the various embodiments of the present invention shown therein.

DETAILED DESCRIPTION OF THE PREFERRED EMBODIMENTS

Figure 11:
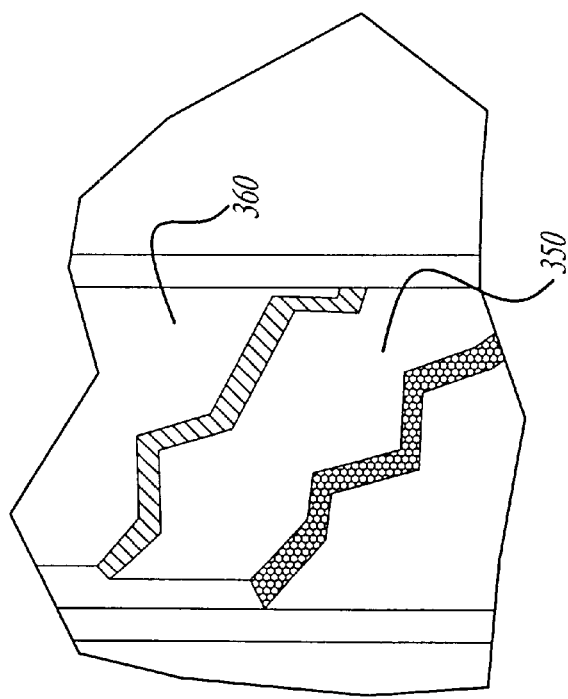
FIG. 11 is a partial broken-away view of an insulation layer and a durable covering for a sidewall of a typical canopy, in accordance with one aspect of the present invention.

Referring to FIG. 1, a truck trailer body system with sliding nestable canopies, in accordance with one aspect of the present invention, is shown and generally denoted by the numeral 10. It will be appreciated that the truck trailer body system 10 of the present invention is intended to be mounted onto a conventional trailer underbody or frame having a chassis which typically is provided with multiple axle and wheel assemblies, as shown in phantom. The trailer underbody in turn is removably coupled to a tractor. The trailer underbody and the tractor are conventional and thus are shown in phantom.

The truck trailer body system 10 of the present invention is comprised primarily of a canopy system 20, a transport system 30 (not shown), a mounting system 40, a support system 50 (not shown), an anti-decoupling system 60 (not shown), and a securing system 70.

Canopy system 20 of the present invention preferably comprises a plurality of slidable nestable canopies 80, 90 and 100 which can be readily moved along the trailer bed as desired, as is shown and will be further described. By the term "nestable" as used herein, it is meant that a relatively smaller canopy is able to be substantially fully received within the interior space or volume of a relatively larger canopy. The terms "telescoping" and "collapsing" have also been used to further describe this particular configuration and relationship of objects. In particular, the relatively smaller canopies of the present invention are able to be telescopically received and slidably disposed substantially within the relatively larger canopies. This is best understood in general by viewing and considering FIGS. 2, 3 and 4 together. In FIG. 2, the canopy system 20 is shown fully extended. In FIG. 3, the canopy system 20 is partially nested (i.e., it may also be called partially extended), and FIGS. 4 and 5, where the canopy system 20 is shown fully nested.

The individual canopies of the present invention preferably have a substantially equal length. However, it should be appreciated that the heights and widths of the individual canopies differ in order to provide for the nesting feature. Thus, in a three canopy system, the largest canopy has the greatest height and greatest width as compared to the other two canopies. The next largest canopy has a height and a width respectively that is less than those of the largest canopy, but greater than those of the smallest canopy. The smallest canopy has the smallest height and smallest width, smaller than those of either the largest and the next largest canopies. These differing heights and cross-sectional widths of the individual canopies help provide for the nesting feature. For example, the first canopy 80 may be at least six feet tall and six feet wide, the second canopy 90 may be at least five feet tall and five feet wide, and the third canopy 100 may be at least four feet high and four feet wide. In practice, the tallest canopy will often be taller, up to some maximum total height (such as about seven feet to almost nine or ten feet) that still can pass under most highway bridges even when about three to five feet off the ground on account of the height of the trailer bed. Also, in practice, the width can and will be greater, such as between about seven to almost ten feet, or even wider if extra wide trailer widths are needed. However, the nestable canopies of the present invention may be made on a smaller scale as well. For example, the first canopy may have opposed side walls spaced at least about four to about six feet apart from one another, and a roof that is at least about four feet high; its second canopy may have side walls spaced at least about five feet apart and be at least about three feet high; and its third canopy may be spaced at least four feet apart from one another and be at least about two feet high. In practice, the variations in the widths and heights between the canopies may be made smaller than one foot, such as six inches, especially if the overall thickness of the roof and wall sections is reduced to about three inches (or less).

Although three canopies, each of varying dimensions, are shown in FIG. 2, it should be appreciated that either less than this number of canopies may be used (e.g., two canopies) or more than this number of canopies may be used (e.g., four or more canopies) to practice the present invention. One advantage of using a greater number of sliding nestable canopies is that a greater proportion of the cargo can be accessed at any one given time. For example, if two canopies are employed, approximately 50% of the cargo area can be accessed at any one time by substantially fully nesting the smaller canopy within the larger canopy. However, by employing three canopies, about two-thirds of the cargo area can be accessed at one time by substantially fully nesting the two relatively smaller canopies within the largest canopy. Likewise, if four canopies are employed, approximately three-fourths of the cargo area can be accessed at one time by substantially fully nesting the three relatively smaller canopies within the largest canopy. It should be appreciated that the previous examples are intended for illustrative purposes only, and are not meant to limit the scope of the broader aspects of the claimed invention.

Although canopies 80, 90 and 100 are depicted in FIG. 2 as having a transverse cross-section that is generally an inverted U-shape, it should be appreciated that canopies 80, 90 and 100 may be fashioned into a plurality of different configurations. In alternate versions of the present invention, canopies 80, 90 and 100 may have transverse vertical cross-sections that are substantially rectangular (as shown in FIG. 6) or have substantially rounded upper edges (as shown in FIG. 7), or they may be generally trapezoidal (not shown), or generally semi-circular (not shown), or have generally semi-circular or smooth arcuate roof section with substantially vertically depending side walls (not shown). A key consideration is that canopies 80, 90 and 100, no matter what their precise transverse vertical cross-sectional shape, must be nestable to a substantial degree with one another.

Referring to FIG. 2, canopies 80, 90 and 100 are preferably each comprised primarily of roof sections 110, 130 and 150 and a pair of downwardly depending sidewalls 120, 140 and 160, respectively. The roof sections 110, 130 and 150 and their corresponding pair of downwardly depending side walls 120, 140 and 160, respectively, may be comprised of one of more materials such as, without limitation, wood, plastic, fiberglass, or metal, with the metal preferably being an aluminum alloy or other lightweight metal alloy. Sheets of one material may be placed over an interior structural frame made of suitable material such as wood, or steel or aluminum alloy. If the material employed is either plastic, fiberglass, metal, or some other extrudable material, canopies 80, 90 and 100 are preferably extruded or otherwise formed where practical to do so as a single piece, in order to reduce the number of potential fatigue points. In other words, if canopies 80, 90, and 100 and/or their respective interior frames are comprised of a plurality of individual components which are joined together or overlapped at joints or seams, the potential for weakening at a particular joint or seam is increased. However, with canopies formed largely of extruded or pressed sheets and members, the potential for a weakening of integrity of the canopy is diminished. Further, minimizing the number of joints or seams helps reduce the number of places through which ambient air or water may leak into the enclosed interior space.

The pair of downwardly depending sidewalls 120, 140 and 160, respectively, may be oriented at various angles as desired. For example, they may be vertical as shown, or may be tilted from about 5 to about 30 degrees from the vertical, as desired, provided canopies 80, 90 and 100 are able to be function or operate in a nesting or telescoping manner.

Referring to FIG. 8, at least a portion of the vertical edges or peripheral surfaces 170 of canopies 80, 90 and 100 can optionally be provided with a sealing system, such as a substantially continuous gasket or weatherstrip 180. The weatherstrip 180 is preferably comprised of a resiliently deformable material, such as rubber or a thermoplastic. The weatherstrip 180 aids in preventing or minimizing the amount of wind and environmental debris entering the interior area of the truck trailer body system 10. Additionally, if some wind and airborne environmental contaminants do manage to enter the interior area of the truck trailer body system 10, the speed and movement of the wind and environmental contaminants carried thereby will be prevented or minimized, thus keeping the contaminants off of the various surfaces of the cargo.

Referring to FIG. 2, the exterior surface of sidewalls 120, 140 and 160 can optionally be provided with a plurality of roller assemblies or mechanisms 300 in order to facilitate the free movement of canopies 80, 90 and 100 as they move or slide alongside one another. Referring to FIGS. 9 and 10, exemplary roller assembly 300 preferably comprises a wheel or caster 310 rotatably mounted in a bracket assembly 320, that in turn is mounted to a plate 330 mounted on a portion of peripheral surface 170 of one of the canopies of the present invention. On an adjacent canopy, an elongated strike plate 340 is provided. Strike plate 340 is preferably rigidly mounted to the sidewall at a height approximately the same as roller assembly 300. Wheel 310 preferably glides on the surface of strike plate 340 as the respective canopies are moved from a fully nested to a fully extended position as well as all other intermediate positions. In this manner, the manual movement of the canopies of the present invention is facilitated.

Referring to FIG. 11, the interior surfaces of sidewalls 120, 140 and 160 of the canopies 80, 90 and 100 can optionally be insulated in order to allow for temperature stabilization or control of the interior of the truck trailer body system 10. The insulation may be of any conventional or suitable variety, and may also be selected to assist in sound attenuation or noise abatement. For example, certain types of cargo may rattle, and thereby produce unacceptable levels of noise during transportation, thus creating road noise pollution concerns. The insulation 350 can be comprised of a plurality of materials such as, without limitation, foam, fibrous material, thermoplastics, fiberglass, or other suitable materials. The insulation 350 can be secured in place by a durable covering 360. Durable covering 360 can be comprised of a plurality of materials such as, without limitation, rubber, wood, fabric, thermoplastics, fiberglass, or metal, preferably aluminum. Alternatively, conventional composite or laminated insulating sheet material may be used. For example, such an insulating coverage may have a softer closed cell thermoplastic foam interior layer and an external durable rubberized hard outer layer.

Figure 17:
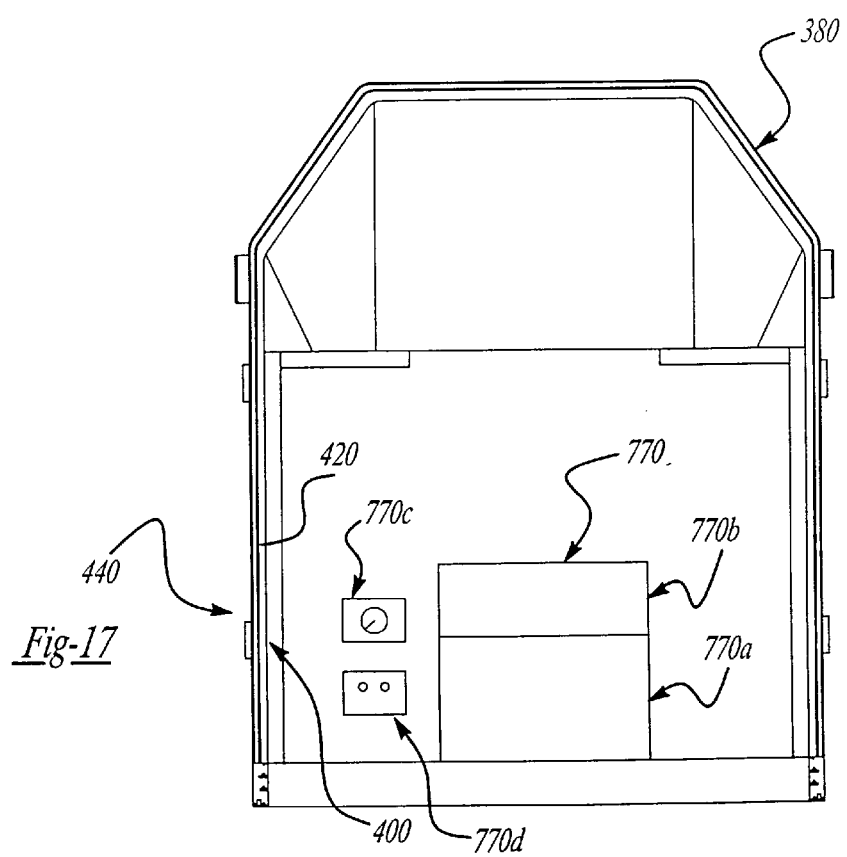
FIG. 17 is an inside end elevational view of the FIG. 1 front bulkhead, in accordance with one aspect of the present invention, showing a combined air-conditioning/air heating unit centrally positioned within and inside of this front bulkhead.

Referring to FIG. 17, a temperature control system 770 can optionally be provided so as to provide heating or refrigeration to the interior area of the truck trailer body system 10. The temperature control system 770 can be mounted on either an interior or exterior surface of the truck trailer body system 10. The temperature control system 770 can optionally be comprised of a heater 770a, an air conditioner 770b, a combination of the two, as well as a temperature sensor 770c and a temperature control adjustment assembly 770d.

Referring to FIGS. 12, 13a, 13b and 13c, the transport system 30 of the present invention will now be described in detail. By the term "transport system" as that term is used herein, it is meant to describe any type of device or mechanism that allows the canopies to be moved from one location to another location on the trailer. As shown in FIGS. 12, 13a, 13b and 13c, a plurality of wheels, roller assemblies or mechanisms, casters, or other suitable devices 470, 480 and 490 are fastened to the lower portion or surface of sidewalls 120, 140, and 160 of canopies 80, 90, and 100 for allowing the canopies to move relatively freely along the entire length of the mounting system 40. The wheels of devices 470, 480 or 490 can be comprised of a plurality of materials; however, metallic materials are generally preferred due to their strength and durability. Preferably, at least two spaced wheeled devices are provided on each side of each canopy, for a total of at least four wheels per canopy. At least this number of wheels is generally needed to provide for proper balancing of the canopies so as to prevent tipping. More preferably, at least four spaced wheels are provided on each sidewall of each canopy, for a total of eight wheels per canopy, in order to enhance the stability of, and the ability to move, the canopy. The particular means for fastening the plurality of wheels 470, 480 and 490 to sidewalls 120, 140 and 160 is not critical provided that they allow for the free movement of canopies 80, 90 and 100 within mounting system 40. For example, a plurality of bracket assemblies 500, 510 and 520 can be rigidly fastened to the lower portion of sidewalls 120, 140 and 160 respectively. Each bracket assembly would then receive axles 530, 540 or 550, respectively, which in turn would receive wheels 470, 480 or 490, respectively, rotatable thereabout. Wheels 470, 480 or 490 would then be secured in place by nuts, bolts, or other suitable fasteners. Thus, it is the rotation of wheels 470, 480 and 490 which provide the means of moving canopies 80, 90 and 100 from one location on mounting system 40 to another location on mounting system 40.

Figure 12:
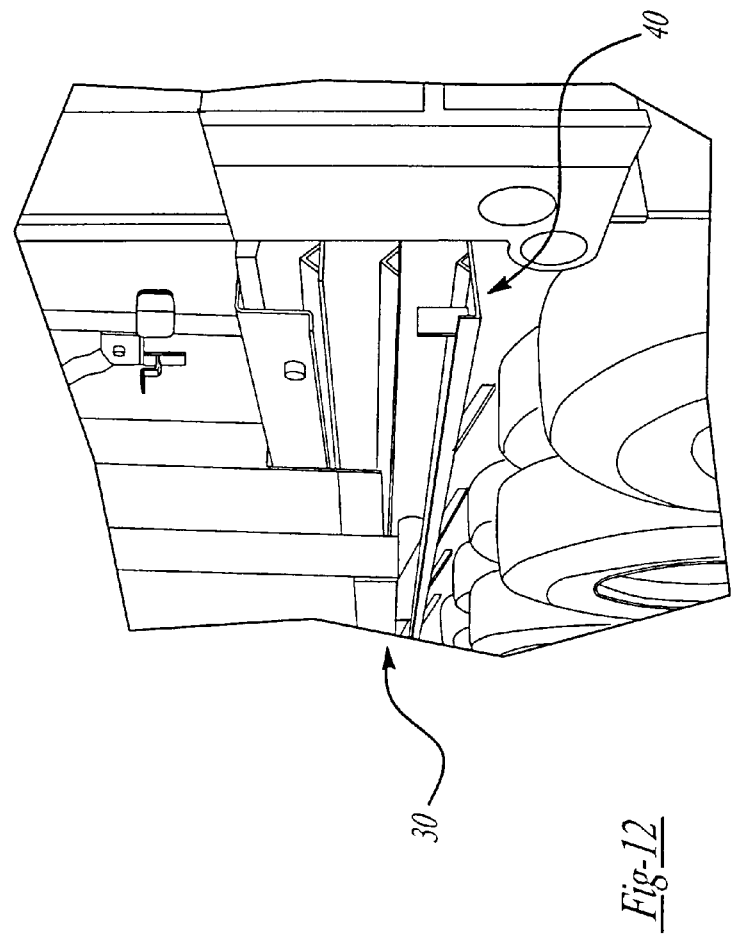
FIG. 12 is an enlarged perspective view of the left rear portion of the trailer bed, showing three elongated tracks fastened in a vertically stacked fashion to the left side of the trailer bed, with the three canopies shown substantially nested together near the rear bulkhead, in order to show the relation between these canopies and their roller mechanisms, and how they are able to move along the elongated tracks on their rollers, which tracks constitute the mounting system, all in accordance with one aspect of the present invention.

Referring to FIGS. 12. 13*a*, 13*b* and 13*c*, the mounting system 40 of the present invention will now be described in detail. Mounting system 40 preferably comprises a plurality of elongated tracks, grooves, recesses, rails, or other suitable devices 560, 570 and 580 preferably rigidly attached to a side surface of support system 50 of truck trailer body system 10. Tracks 560, 570 and 580 receive wheels 470, 480 and 490 of canopies 80, 90 and 100, respectively. Tracks 560, 570 and 580 preferably extend along substantially the entire side surface of support system 50. Tracks 560, 570 and 580 may be of any configuration provided that they allow canopies 80, 90 and 100 to slide relatively freely along substantially the entire length of tracks 560, 570 and 580. Preferably, tracks 560, 570 and 580 are substantially planar and extend in a substantially parallel direction in relation to support system 50. Tracks 560, 570 and 580 may be comprised of a plurality of materials; however, it is generally preferred to use metallic materials such as, without limitation, steel and/or aluminum.

Referring to FIG. 13*c*, wheels 470, 480 and 490 cooperate with tracks 560, 570 and 580 in that wheels 470, 480 and 490 preferably rest upon the top surface of tracks 560, 570 and 580. In accordance with one embodiment of the present invention, a plurality of raised inverted V-shaped members 590, 600 and 610 are disposed in tracks 560, 570 and 580, and cooperate with double V-shaped wheels 470, 480 and 490. In this manner, the weight of canopies 80, 90 and 100 are more evenly distributed across tracks 560, 570 and 580. Wheel 470 is prevented from derailing by a raised flange 620 extending along the length of the outer periphery of track 560. Wheels 480 and 490 are prevented from derailing by abutting against various surfaces of sidewalls or bracket assemblies that are in close proximity. Additionally, tracks 570 and 580 can optionally be provided with raised flanges in order to prevent the derailment of wheels 480 and 490.

Figure 14:
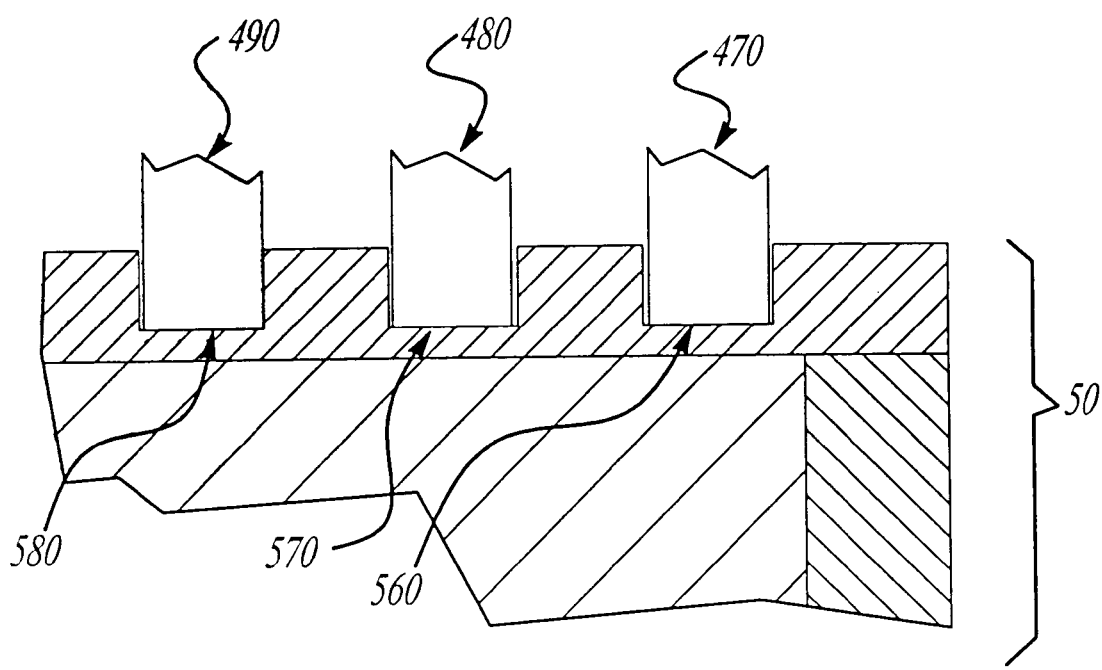
FIG. 14 is a partial cross-sectional view of an alternative mounting system for supporting the canopies in movable relation to the trailer bed, with three tracks spaced horizontally along the trailer bed, for receiving rollers that support the canopies.

Referring to FIG. 14, in accordance with an alternative embodiment of the present invention, tracks 560, 570 and 580 are disposed within the top surface of support system 50 extending substantially from the forward bulkhead 380 to the rear bulkhead 390. Tracks 560, 570 and 580 extend in a straight line substantially parallel to the side surface of support system 50. In this embodiment, tracks 560, 570 and 580 are merely grooves or recesses in which wheels 470, 480 and 490 rest and travel within. In an alternative embodiment of the present invention, these grooves or recesses may be raised above the horizontal level of support system 50, so as to form a raised track system. Wheels 470, 480 and 490 would then be mounted or disposed within this raised track system.

Figure 15:
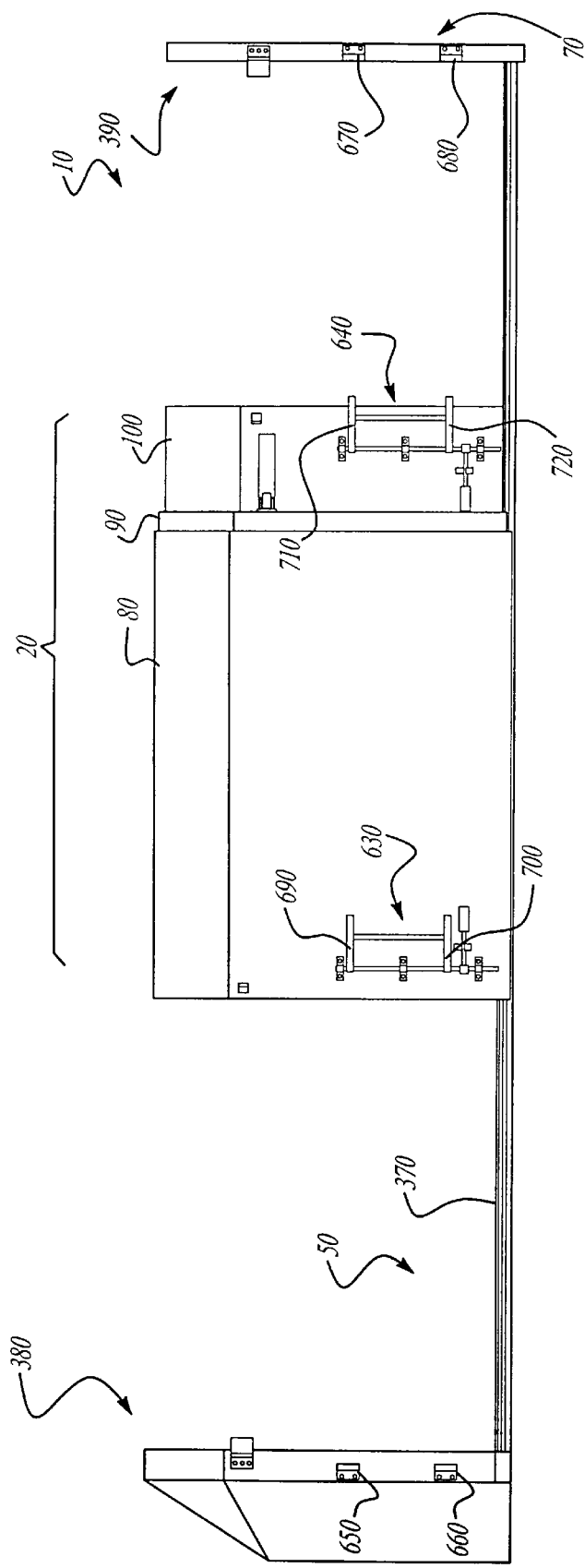
FIG. 15 is a side elevational view of the FIG. 1 canopy system, with the canopies shown in a substantially fully nested state and positioned near mid-position of the trailer bed.

Referring to FIG. 15, support system 50 of the present invention preferably comprises a bed or deck 370. Bed 370 is generally a substantially planar surface constructed of a substantially rigid material such as metal or wood. Bed 370 preferably includes a peripheral metal frame with a top surface formed of durable hardwood planking fastened together and/or mounted to a conventional bed support structure (not shown) or directly to the underframe or chassis. Bed 370 provides the physical support necessary to carry the cargo. The particular configuration of bed 370 will be dependent on the geometric configurations of the truck trailer body system 10. Thus, for example, a rectangularly shaped canopy will generally be associated with a rectangularly shaped bed. Front and rear terminating members, to assist in ensuring that the canopies of the present invention do not extend past the front or rear surface of bed 370 and thus derail. In the preferred embodiments, shown herein, these are forward bulkhead 380 and a rear bulkhead 390.

Figure 16:
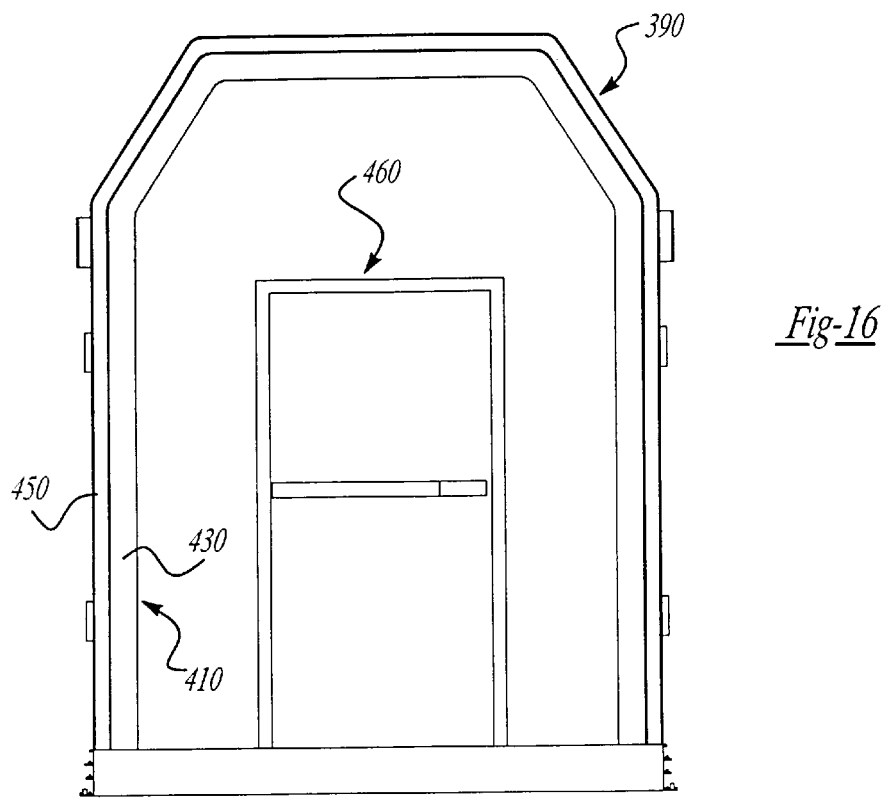
FIG. 16 is an end elevational view of the outside of the FIG. 1 rear bulkhead, looking toward the front, and showing an optional access door in the bulkhead, and revealing the outer edge of the front bulkhead, in accordance with one aspect of the present invention.

Referring to FIGS. 16 and 17, the vertical edges or peripheries 400 and 410 of bulkheads 380 and 390, respectively, can optionally be provided with a groove or recess 420 and 430, respectively, that cooperates or mates with the resiliently deformable material 180 of the vertical edges or peripheries 170 of the canopies of the present invention. Additionally, the vertical edges or peripheries 400 and 410 of bulkheads 380 and 390 can optionally be provided with a substantially continuous gasket or weatherstrip 440 and 450, preferably comprised of a resiliently deformable material, such as rubber, neoprene or a thermoplastic. In this manner, when the resiliently deformable material 180 of the vertical edges or peripheries 170 of the canopies of the present invention mates with grooves 420 and 430 of either of bulkheads 380 and 390, a substantially watertight and airtight seal may be established about the forward and rear bulkheads 380 and 390, respectively. Additionally, the rear bulkhead 390 can optionally be provided with a selectively operable hatch or door 460 or other suitable means of ingress into and egress from the interior of the truck trailer body system 10.

Figure 18:
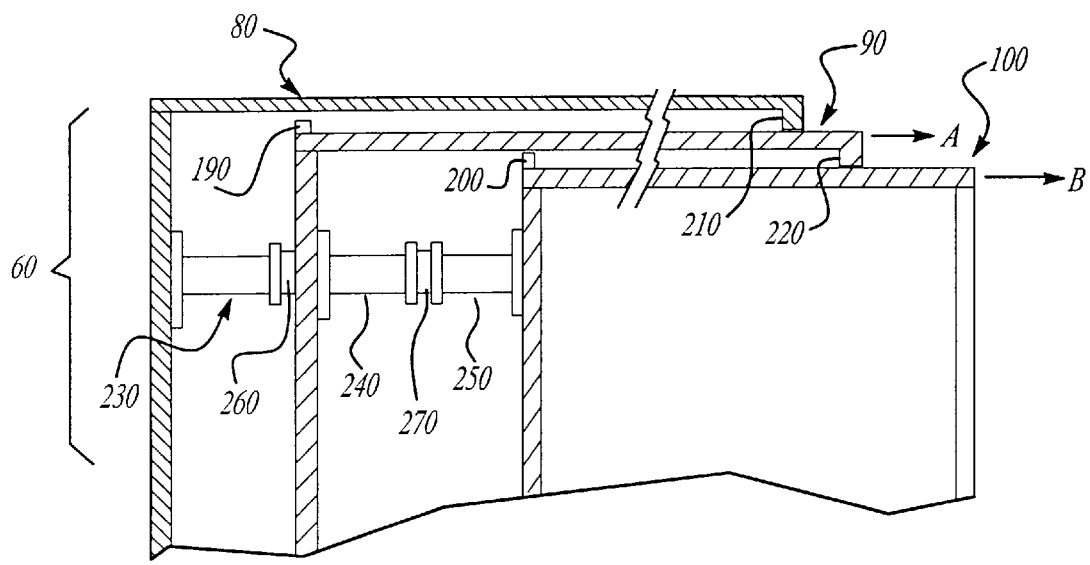
FIG. 18 is an enlarged partial cross-sectional view of the upper portions of the three canopies shown in a fully nested state, in order to reveal a canopy interlocking system to prevent decoupling of adjacent canopies when in their fully extended state, in accordance with one aspect of the present invention.

Referring to FIG. 18, canopy anti-decoupling system 60 of the present invention will now be described in detail. The system 60 and the canopies 80, 90 and 100 preferably cooperate with one another in order to prevent one canopy from completely decoupling from the adjacent canopy when canopies 80, 90 and 100 are fully extended. One method of accomplishing this is to provide a protuberance or member such as, without limitation, flanges or bracket assemblies 190, 200, 210 and 220, respectively, on at least a portion of one peripheral surface of each canopy. Bracket assemblies 190, 200, 210 and 220 are preferably rigidly fastened to these peripheral surfaces. In operation, when one bracket assembly of a canopy abuts the bracket assembly of an adjacent canopy, the respective canopies cannot be extended any further away from one another. For example, bracket assembly 190 cooperates with bracket assembly 210, in that as canopy 90 is extended in the direction of arrow A away from canopy 100, bracket assembly 190 will eventually abut bracket assembly 210, which prevents further movement of canopy 90 in direction A. Likewise, bracket assembly 200 cooperates with bracket assembly 220, in that as canopy 100 is extended in the direction of arrow B away from canopy 90, bracket assembly 200 will eventually abut bracket assembly 220 preventing further movement of canopy 100. Bracket assemblies 190, 200, 210 and 220 also provide a barrier against the infiltration of wind and environmental debris when canopies 80, 90 and 100 are fully extended.

Figure 19:
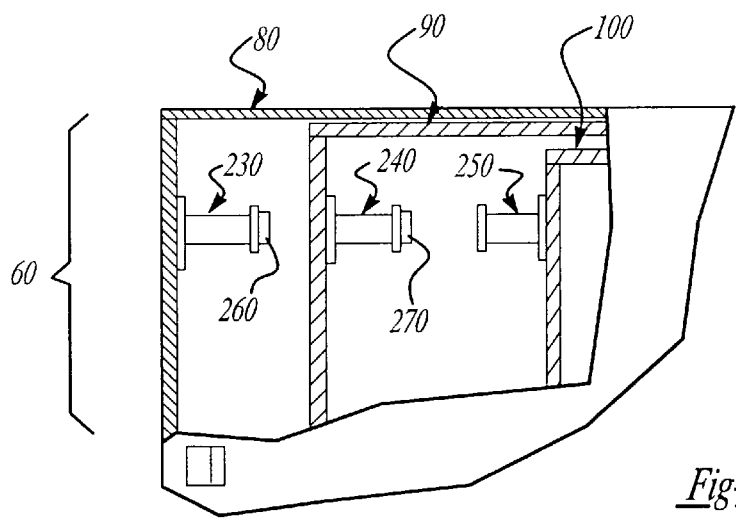
FIGS. 19 and 20 are enlarged partial cross-sectional views of the circled area shown in hidden lines in FIG. 4, namely the upper inside portions of the three canopies shown in a fully nested state (FIG. 19) and in an almost fully nested state (FIG. 20), which help illustrate the internal spacer members, with bumper pads on the free ends thereof, for limiting the depth to which the canopies may nest within one another, in accordance with one aspect of the present invention.

Additional features of anti-decoupling system 60 of the present invention will now be described in detail. Referring to FIG. 19, a plurality of stops 230, 240 and 250 are provided to prevent one canopy from completely decoupling from the adjacent canopy during the nesting procedure. In other words, the canopies of the present invention are preferably not fully nestable, but rather are substantially fully nestable in order to facilitate manual movement of the canopies. The canopies of the present invention are intended to be moved manually through the use of a plurality of handles 280 and 290 (FIG. 2) or other suitable devices that are rigidly fastened to an exterior surface of canopies 80, 90 and 100. Thus, if canopies 80, 90 and 100 were fully nestable, the operator would have difficulty accessing handles 280 and 290. However, the present invention also envisions a fully nestable canopy system that provides suitable means or members for allowing movement of the canopies. Stops 230, 240 and 250 can optionally be provided with a gasket or cushion 260 and 270, respectively, preferably comprised of a resiliently deformable material, on the leading surface so as to not damage the adjacent stops or bracket assemblies. In FIG. 19, canopies 80, 90 and 100 are shown in what may be referred to as either a partially nested position or a partially extended position.

Figure 20:
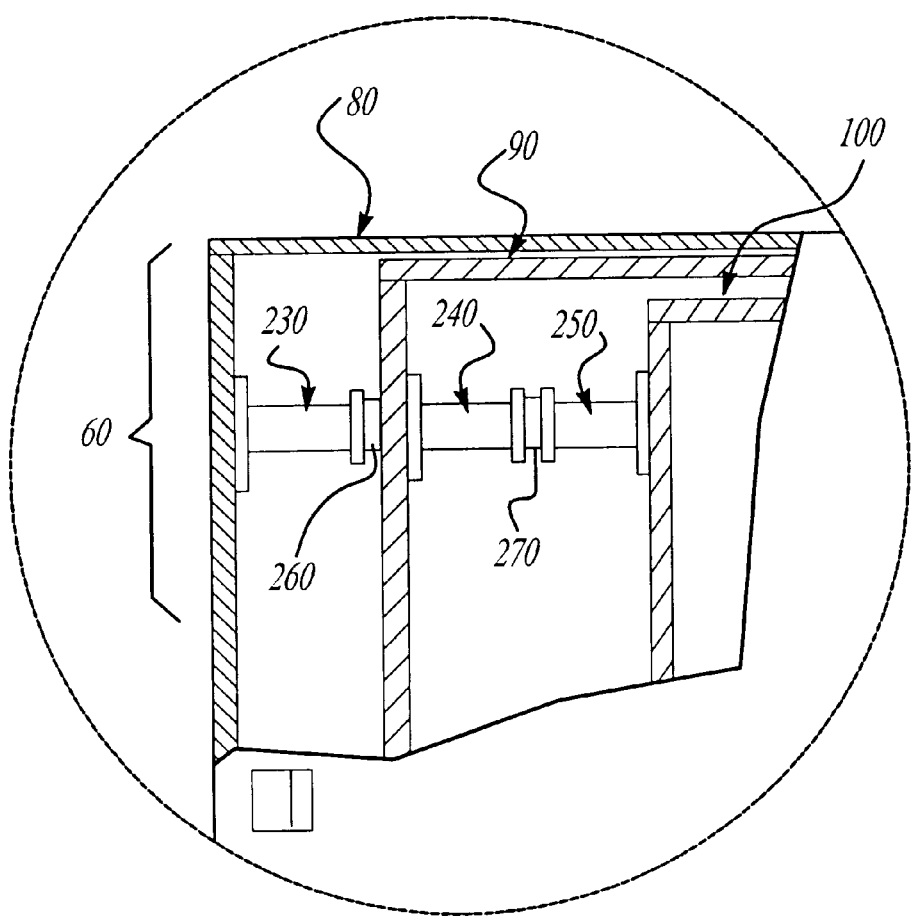

Referring to FIG. 20, canopies 80, 90 and 100 are shown in their substantially fully nested position with stops 230, 240 and 250 abutting their respective adjacent stops or bracket assemblies.

Securing system 70 of the present invention will now be described in detail. Once canopies 80, 90 and 100 are fully extended or telescoped, as depicted in FIG. 2, canopies 80 and 100 can conveniently be secured in place to their respective bulkheads 380 and 390 by a plurality of selectively operable members, brackets, clamps, hooks, belts, clasps, buckles, or other suitable devices 630 and 640. Preferably, bulkheads 380 and 390 are provided with a plurality of rigidly attached members 650, 660, 670 and 680 that cooperate with a plurality of selectively operable members 690, 700, 710 and 720, respectively, located on an exterior surface of sidewalls 120 and 160.

Figure 21:
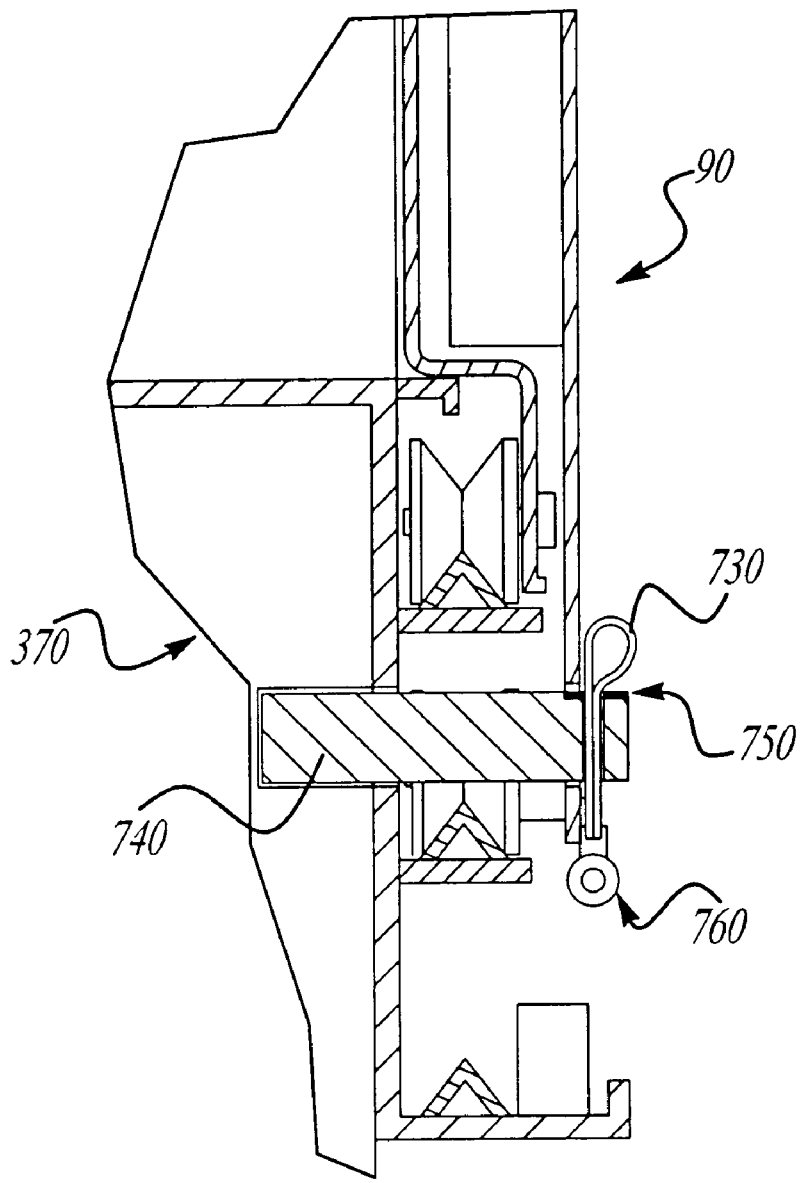
FIG. 21 is an enlarged partial cross-sectional view of the left side portion of the trailer bed, similar to FIGS. 13B and 13C, showing a securing system of helping interlock the middle canopy to the trailer bed with a mechanical shot pin member penetrating the lower side wall portion of the canopy and entering into corresponding locking hole in the trailer bed.

Referring to FIG. 21, a shot pin 730 may be used to secure a selectively operable block 740 in place to prevent vertical and horizontal movement of canopy 90. Block 740 may be recessed in the body of bed 370 when not in use, and may be extended outwardly from the body of bed 370 when in use. A selectively operable member or bracket 750 may be employed to receive shot pin 730, a T-bar device, or other suitable device. Shot pin 730 would then be passed through an aperture in bracket 750 and then through a corresponding aperture in block 740 which aligns with the aperture in bracket 750. Once this has been done, a lock 760 or other suitable device may be secured to the lower portion of shot pin 730 to prevent removal of shot pin 730. This method of securing the canopies, especially middle or intermediate canopies, will prevent or minimize unwanted horizontal and vertical movement of the canopies during transportation.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, the number, size and shape of the canopies and bulkheads may be varied. Also, different arrangements for interlocking the canopies together or a canopy and a bulkhead may be utilized. Further, different transport systems and canopy movement guide systems other than roller mechanisms and elongated tracks may be used. Accordingly, it is to be understood that the protection sought and to be afforded hereby should be deemed to extend to the subject matter defined by the appended claims, including all fair equivalents thereof.

What is claimed is:

1. A highway truck trailer body system with sliding nestable canopies for substantially selectively covering and protecting cargo, comprising:

an elongated trailer bed comprised of substantially rigid material and being at least about twenty feet long and at least about six feet wide, and having at least one load-bearing surface for supporting cargo, the trailer bed having a front portion, rear portion, and elongated side portions, with the load-bearing surface located substantially therebetween;

an upstanding front bulkhead positioned at the front portion of the trailer bed;

an upstanding rear bulkhead positioned at the rear portion of the trailer bed;

a first movable canopy, about at least six feet high and about at least six feet wide, comprised of a substantially rigid material and having a roof and a pair of opposed and spaced downwardly depending side walls and being substantially open in the front and rear, the first canopy generally being positioned over at least part of the load-bearing surface of the trailer bed;

a plurality of first guide mechanisms for assisting in keeping the first canopy positioned generally above the trailer bed as the first canopy is moved along the trailer bed in between the front and rear bulkheads;

a plurality of first moving mechanisms connected to the pair of walls of the first canopy and in selectively movable contact with the first guide mechanisms for facilitating selective movement of the first canopy along the trailer bed in between the front and rear bulkheads;

a second movable canopy, about at least five feet high and about at least five feet wide, comprised of a substantially rigid material and having a roof and a pair of opposed and spaced downwardly depending side walls and being substantially open in the front and rear, the second canopy generally being positioned over at least part of the load-bearing surface of the trailer bed;

a plurality of second guide mechanisms for assisting in keeping the second canopy positioned generally above the trailer bed as the second canopy is moved along the trailer bed in between the front and rear bulkheads;

a plurality of second moving mechanisms connected to the pair of walls of the second canopy and in selectively movable contact with the second guide mechanisms for facilitating selective movement of the second canopy along the trailer bed in between the front and rear bulkheads;

a third movable canopy, about at least four feet high and about at least four feet wide, comprised of a substantially rigid material and having a roof and a pair of opposed and spaced downwardly depending side walls, the third canopy generally being positioned over at least part of the load-bearing surface of the trailer bed and being substantially open in the front and rear;

a plurality of third guide mechanisms for assisting in keeping the third canopy centrally positioned about the longitudinal axis of the trailer bed as the third canopy is moved along the trailer bed between the front and rear bulkheads; and a plurality of third moving mechanisms connected to the pair of walls of the third canopy and in selectively movable contact with the third guide mechanisms for facilitating selective movement of the third canopy along the trailer bed in between the front and rear bulkheads.

2. The truck trailer body system of claim 1, wherein:

the first, second and third canopies are constructed so that each is about one-third the length of the trailer bed, and are arranged on the trailer bed so that the second canopy is selectively substantially nestable within the first canopy, and the third canopy is selectively substantially nestable within the second canopy, and so that, when the first canopy is positioned in contact with the front bulkhead, the third canopy is positioned in contact with the rear bulkhead, and the second canopy is positioned generally between the first and second canopies, a substantially enclosed protected space is formed between the front and rear bulkheads and under the first, second and third canopies, and the truck trailer body system further comprises:

means for selectively securing the first canopy to the front bulkhead; and means for securing the third canopy to the rear bulkhead; and means for keeping the second canopy in a substantially fixed position generally between the first and third canopies, when the first and third canopies are respectively secured to the front and rear bulkheads.

3. The truck trailer body system of claim 1, further comprising:

at least one layer of thermally insulating material disposed adjacent to each of the roofs and walls of the first, second, and third canopies; and means for helping control the temperature within a substantially enclosed space of the truck trailer body system located between the front and rear bulkheads and under the first, second and third canopies.

4. The truck trailer body system of claim 2, wherein:

the first, second and third guide mechanisms are respectively comprised of pairs of first, second and third elongated tracks, which tracks extend along substantially most of the length of both side portions of trailer bed, the tracks being rigidly connected to the side portions of the trailer bed, and the first, second and third moving mechanisms each include a plurality of roller members, with at least two such roller members being associated with and provided to support each one of the side walls of the first, second and third canopies, whereby the first, second and third canopies are rollable on their respective rollers along their respective elongated tracks to at least a plurality of possible positions on the trailer bed, thereby facilitating loading, unloading and inspection of cargo on the load-bearing support surface of the trailer bed, and the means for selectively securing the first canopy to the front bulkhead includes at least a pair of interlockable mechanisms located on opposite sides of the first canopy, each interlockable mechanism having associated first and second members respectively mounted on the first canopy and the front bulkhead, the associated first and second members thereof being arranged to be selectively lockingly interconnected to one another, whereby the first canopy is selectively maintainable in close proximity to the front bulkhead, and the means for selectively securing the third canopy to the rear bulkhead includes at least a pair of interlockable mechanisms located on opposite sides of the third canopy, each interlockable mechanism having associated first and second members respectively mounted on the third canopy and the rear bulkhead, the associated first and second members thereof being arranged to be selectively lockingly interconnected to one another, whereby the third canopy is selectively maintainable in close proximity to the front bulkhead.

5. A truck trailer body system with sliding nestable canopies for selectively covering and protecting cargo, comprising:

an elongated towable trailer having a bed and a frame supporting the bed and having at least one rear axle and a pair of wheels, the bed being at least about twenty feet in length and having a width of about at least six feet;

a first movable canopy, comprised of a substantially rigid material, and having a roof and a pair of opposed, downwardly depending side walls spaced at least about six feet apart from one another and being at least about four feet high;

a pair of first track members rigidly connected to the trailer;

a plurality of first roller mechanisms connected to the walls of the first canopy, the first roller mechanisms engaging the first track members;

a second movable canopy, comprised of a substantially rigid material, and having a roof and a pair of opposed downwardly depending walls spaced at least about five feet apart from one another and being at least about three feet high, the second canopy being configured to be telescopically receivable by and slidably disposed substantially within the first canopy;

a pair of second track members rigidly connected to the trailer;

a plurality of second roller mechanisms connected to the walls of the second canopy, and the second roller mechanisms engaging the second track members;

a third movable canopy, comprised of a substantially rigid material, having a roof and a pair of opposed downwardly depending walls spaced at least four feet apart from one another and being at least about two feet high, the third canopy being configured to be telescopically receivable by and slidably disposed substantially within the second canopy;

a pair of third track members rigidly connected to the trailer; and a plurality of third roller mechanisms connected to the walls of the third canopy, and the third roller mechanisms engaging the third track members, whereby the first, second and third canopies are selectively movable back and forth along the trailer bed on their respective roller mechanisms and elongated track members.

6. The truck trailer body system of claim 5, wherein the trailer has a front portion and a rear end portion, the system further comprising:

a front bulkhead rigidly connected the front portion of the trailer; and a rear bulkhead rigidly connected to the rear portion of the trailer, the first canopy having a front portion being positionable in abutting relation to the front bulkhead, and arranged to be selectively connectable thereto, the third canopy having a rear portion being positionable in abutting relation to the rear bulkhead, and arranged to be selectively connectable thereto.

7. The truck trailer body system claim 6, further comprising:

a plurality of first retaining mechanisms associated with the front bulkhead and the first canopy, the first retaining mechanisms being arranged for selectively coupling the first canopy to the front bulkhead to hold the first canopy in a substantially fixed position and abutting relation to the front bulkhead; and a plurality of second retaining mechanisms associated with the rear bulkhead and the third canopy, the second retaining mechanisms being arranged for selectively coupling the third canopy to the rear bulkhead to hold the third canopy in a substantially fixed position and abutting relation to the rear bulkhead.

8. The truck trailer body system of claim 5, further comprising:

means for preventing the first canopy from decoupling from the second canopy; and means for preventing the second canopy from decoupling from the third canopy.

9. The truck trailer body system of claim 5, wherein:

the first, second, and third track members comprise first and second sets of three elongated tracks respectively connected to first and second opposed sides of the trailer bed, the first and second sets of elongated tracks extending substantially the entire length of the side of the trailer bed.

10. The truck trailer body system of claim 5, wherein:

the first canopy has at least one layer of insulation material disposed adjacent to the roof and side walls thereof, the second canopy has at least one layer of insulation material disposed adjacent to the roof and side walls thereof, the third canopy has at least one layer of insulation material disposed adjacent to the roof and side walls thereof, and the truck trailer body system further includes means for helping control the temperature of a substantially enclosed space formed by the first, second and third canopies when those canopies are in an extended substantially unnested state.

11. A truck trailer body system for trailers which are used on highways, the trailer body system being provided with nestable canopies for selectively covering and protecting cargo, the trailer body systems comprising:

a trailer bed having a front and a rear and elongated sides and at least one load-bearing surface for cargo between the front and rear, the trailer bed being greater in length than in width;

a substantially rigid first canopy having a roof and a pair of opposed side walls and a substantially open front and rear area between the side walls and below the roof;

first means operably associated with the first canopy for enabling the first canopy to be selectively moved forwardly and backwardly along the trailer bed without removing the first canopy from the trailer bed;

a substantially rigid second canopy having a roof and a pair of opposed side walls and a substantially open front and rear area between the side walls and below the roof, the second canopy being sized and arranged to be disposed substantially within the first canopy; and second means operably associated with the second canopy for enabling the second canopy to be selectively moved forwardly and backwardly along the trailer bed without removing the second canopy from the trailer bed.

12. The truck trailer body system of claim 11, further comprising:

a first bulkhead connected to the front of the trailer bed; and a rear bulkhead connected to the rear of the trailer bed, the first canopy being movable into close proximity to the front bulkhead, and the second canopy movable into close proximity to the rear bulkhead.

13. The truck trailer body system of claim 12, further comprising:

at least one mechanism for securing the first canopy to the front bulkhead; and at least one mechanism for securing the second canopy to the rear bulkhead.

14. The truck trailer body system of claim 11, further comprising:

means for preventing the first canopy from decoupling from the second canopy;

a layer of insulation material disposed on the roof and walls of the first canopy; and a layer of insulation material disposed on the roof and walls of the second canopy.

15. The truck trailer body system of claim 11, wherein:

the first and second means each comprise a plurality of elongated tracks extending substantially the entire length of the trailer bed, the elongated tracks being connected to the side of the trailer bed; and a plurality of wheels ride at least partially on the tracks, the wheels each supporting at least a portion of one of the canopies at least part of the time the canopy is being moved along the tracks.

16. A truck trailer body, for use on highways, with sliding nestable canopies for selectively covering and protecting cargo disposed on an associated trailer, comprising:

a cargo-protecting enclosure system, the system being comprised of a plurality of substantially rigid enclosure sections mountable in selectively movable relation to a trailer having a front end and a rear end, the enclosure sections being configured to be substantially nestable within one another near the front end of the trailer and near the rear end of the trailer, whereby cargo is loadable and unloadable at various locations on the trailer;

a transport system for enabling the individual enclosure sections of the enclosure system, once disposed on the trailer, to be moved relative to the trailer and one another when the trailer is at rest, the transport system including a plurality of support elements associated with each enclosure section;

a mounting system, operably associated with the transport system and fixedly positionable with respect to the trailer, upon which the transport system is mounted to permit the enclosure sections to be moved back and forth along at least most of the length of the trailer; and a securing system for selectively securing each enclosure section in a desired substantially fixed position relative to the trailer, whereby the enclosure sections of the enclosure system are able to remain in their respective fixed position during use of the trailer equipped with the enclosure system on highways.

17. The truck trailer body system of claim 16, wherein:

the enclosure system has at least three enclosure sections, and each of the enclosure sections has a substantially rigid roof, and pair of substantially rigid side walls interconnected to the roof, each of the enclosure sections each having a different cross-sectional width and different height, with at least two of the enclosure sections being arranged to be telescopically received and slidably disposed substantially in at least one enclosure section of relatively greater cross-sectional width and greater height.

18. The truck trailer body system of claim 16, wherein:

the support elements of the transport system are comprised of a plurality of roller mechanisms for each of the enclosure sections, each roller mechanism having a support portion that is rigidly connected to one of the walls of one of the enclosure sections and at least one roller wheel, the mounting system comprises a plurality of mounting members, the roller wheels of the roller mechanisms being mounted for travel along the mounting members, and the securing system includes front and rear bulkheads mountable on the trailer bed, and a plurality of selectively interlockable mechanisms having an interlocked state and unlocked state, and provided with first portions mounted on the enclosure sections and second portions mounted on the front and rear bulkheads.

19. The truck trailer body system of claim 16, further comprising:

a trailer having a front end and a rear end and a cargo-carrying bed therebetween, the front and rear bulkheads being respectively rigidly connected to the front end and the rear end of the trailer; and an anti-decoupling system for preventing the nestable enclosure sections from decoupling from one another, once mounted on the trailer.

20. A method for selectively covering, and for selectively providing substantially unfettered access to, cargo on the bed of an elongated truck trailer to be used for transporting cargo on highways, the method comprising the steps of:

providing at least first, second and third movable nestable substantially rigid enclosure sections, each of the sections having generally vertically depending side wall portions interconnected by a roof portion, the enclosure sections each being interconnectable to adjacent enclosure sections and each being selectively movable along a longitudinal path between the front and rear ends of an elongated trailer bed, and arranged so that up about two-thirds of the trailer bed may be uncovered as desired; and moving at least the first and second enclosure sections in a front-to-rear direction along the trailer bed, without removing the enclosure sections from the trailer, in order to load or unload cargo from the front half of the elongated trailer bed, moving the first and second enclosure sections in a rear-to-front direction to cover cargo loaded onto the front half of the trailer bed; and moving at least the second and third enclosure sections in a rear-to-front direction along the trailer bed, without removing the second and third enclosure sections from the trailer, in order to load or unload cargo from the rear half of the elongated trailer bed; and moving the second and third enclosure sections in a front-to-rear direction to cover cargo loaded onto the rear half of the trailer bed.

* * * * *

UNITED STATES PATENT AND TRADEMARK OFFICE
CERTIFICATE OF CORRECTION

PATENT NO   : 6,017,082
DATED       : January 25, 2000
INVENTOR(S) : Michael C. Leoni It is certified that error appears in the above-identified patent and that said Letters Patent is hereby corrected as shown below:

Column 1, line 45, after "may" insert --be--.

Column 3, line 19, replace "increasing to" with --increasingly--.

Column 6, line 57, after "walls" add --of--.

Column 6, line 62, delete 1st occurrence of "to".

Column 7, line 10, replace "order" with --other--.

Column 7, line 20, after "least" delete --at--.

Column 7, line 43, after "if" delete "the".

Column 8, line 2, delete "within".

Column 9, line 34, after "refer" add --to--.

Column 11, line 44, delete "be".

In the Claims

Column 18, line 53, claim 6, after "connected" add --to--.

Column 18, line 64, claim 7, after "system" add --of--.

Signed and Sealed this

Fifteenth Day of May, 2001

Attest:

NICHOLAS P. GODICI

*Attesting Officer*     *Acting Director of the United States Patent and Trademark Office*